US007326056B1

(12) United States Patent
Foster

(10) Patent No.: US 7,326,056 B1
(45) Date of Patent: *Feb. 5, 2008

(54) COMPUTER-BASED LEARNING ENVIRONMENT UTILIZING QUANTITATIVE MODEL-BASED SIMULATIONS

(75) Inventor: David A. Foster, 2119 W. Potomac Ave., #2, Chicago, IL (US) 60622

(73) Assignee: David A. Foster, Chicago, IL (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/663,579

(22) Filed: Sep. 16, 2003

(51) Int. Cl.
G09B 19/18 (2006.01)
(52) U.S. Cl. .................... 434/107; 434/276
(58) Field of Classification Search .............. 434/11, 434/276, 107; 706/902, 927
See application file for complete search history.

(56) References Cited

U.S. PATENT DOCUMENTS 5,813,865 A * 9/1998 Greenbowe et al. ........ 434/276
6,549,893 B1 4/2003 Lannert
6,945,780 B2 * 9/2005 Perry .......................... 434/11

OTHER PUBLICATIONS

Forbus, Kenneth D. (2001) Articulate Software for Science and Engineering Education. In Smart Machines for Education, Eds. Forbus and Feltovich, pp. 235-268. AAAI Press, Menlo Park, California.

* cited by examiner

Primary Examiner—Robert E. Pezzuto
Assistant Examiner—Cameron Saadat

(57) ABSTRACT

A system and method is disclosed that provides a learning environment useful for teaching students about the structure, characteristics, and behavior of a complex system. The learning experience is centered around a quantitative model-based simulation, whose state is updated according to defined algorithms with each successive execution of the model. The learning environment provides the student with user-friendly means for reviewing state information and choosing actions and/or "instrument" values. Several design strategies are combined and implemented to manage the student's cognitive load and engender insights. The student may partially delegate control to automated agents, obtain qualitative descriptions of changes and of model entities, and access algorithmic details that explain causes and effects. The designer can vary simulation behaviors in different problem scenarios to achieve teaching objectives.

19 Claims, 26 Drawing Sheets

|  | $t_0$ | $t_1$ | $t_2$ | $t_3$ | $t_4$ |  |  |  |
|---|---|---|---|---|---|---|---|---|
| Quantity 1 | $n_{0,1}$ | $n_{1,1}$ | $n_{2,1}$ | $n_{3,1}$ | $n_{4,1}$ | . | . | . |
| Quantity 2 | $n_{0,2}$ | $n_{1,2}$ | $n_{2,2}$ | $n_{3,2}$ | $n_{4,2}$ | . | . | . |
| Quantity 3 | $n_{0,3}$ | $n_{1,3}$ | $n_{2,3}$ | $n_{3,3}$ | $n_{4,3}$ | . | . | . |
| Quantity 4 | $n_{0,4}$ | $n_{1,4}$ | $n_{2,4}$ | $n_{3,4}$ | $n_{4,4}$ | . | . | . |
| . | | | | | | | | |
| . | | | | | | | | |
| . | | | | | | | | |

Time Periods

Domain Model state at time $t_3$ (row $t_3$)

$n$: a numeric value

FIG. 2

| All Quantity Values | |
|---|---|
| Quarter: 2013 q1  Click name for definition.  Done | |
| Actual Banking Regulation | 6 |
| Aggregate Bad Loans | 84.7427 |
| Aggregate Demand | 3463.69 |
| Avg Interest Rate | 8.00058 |
| Avg Retirement Benefit | 5000 |
| Avg Unemployment Benefit | 2681.02 |
| Bad Loans Pctg | 0.5566 |
| Banking Regulation | 6 |
| Banking System Bailout | 0 |
| Birth Rate | 2.1 |
| Budget Surplus | -84.8697 |
| Capital Stock | 16582.6 |
| Consumer Confidence Index | 58.2302 |
| Consumption | 2373.32 |
| Consumption Volatility Constant | 0.5 |
| Core Inflation | 6.19549 |
| Core Inflation - Quarterly Rate | 1.54667 |
| Corporate Profit Pctg | 7.11927 |
| Corporate Profits | 263.622 |
| Corporate Tax Rate | 38.5714 |
| Corporate Taxes | 101.683 |

140 — (points to Quarter selector)
142 — (points to list of quantities)

| Field Name | Data Type | Description |
|---|---|---|
| Common fields | | |
| sName | string | A unique identifier for the quantity. This is the name that the student sees, and is also the name used within algorithms to access the quantity values in a scenario. Quantity identifiers are case-insensitive, and any two sequences of whitespace characters are always considered equivalent. |
| bInstrument | boolean | If FALSE, indicates that the quantity is an outcome quantity. If TRUE, indicates that the instrument is either an instrument quantity or an external quantity (described later). |
| sDefinition | string | Provides a brief textual description of the quantity, available to the student. Format is HTML, so that text formatting and links to related information can be embedded. All quantities should observe a similar style and voice in this field. |
| sUnit | string | A standardized text description of what kind of number value the quantity holds. Examples include "1 kilogram", "percent", "years", or "$1 Billion". |
| dPlaceholder | floating point | The default initial value for the quantity, that is, for period 0. |
| sNewsFn | string | Optional. C code that can generate a qualitative description of a change in the state of the model (described later). |
| LineColor | integer | An RGB color value. This color is used as the line color whenever the quantity appears in any QuantitiesGroup window. It may also be used as the text color whenever the quantity name appears as a hyperlink anywhere in the learning environment. |

FIG. 12A

| Field Name | Data Type | Description |
| --- | --- | --- |
| *Outcome-specific fields* | | |
| sNextValueFn | string | C code that implements the outcome quantity's value-computation algorithm. Assumes the result will be placed in the predefined floating-point variable dQResult. |
| sNextValueDescr | string | Provides a brief textual description of the value-computation algorithm. Format is HTML, so that text formatting and links to related information can be embedded. All quantities should observe a similar style and voice in this field. |
| sExplainNVFn | string | Optional. Provides a longer, more detailed textual description of the value-computation algorithm. Format is HTML. Generally speaking, the more lines of code in sNextValueFn, the more highly recommended it is to use this field. |
| *Instrument-specific fields* | | |
| bExternal | boolean | If TRUE, indicates that the quantity is an external quantity (described later) in all scenarios. If bInstrument is FALSE, this field is ignored. |
| sBoundsViolFn | string | C code that checks to ensure that a new instrument value is "legal" for the domain model. If the new value is out of bounds, whether too high or too low, the simulation may not be executed until the value is modified. |
| nFunctionaries | integer | The number of automated agents that have been defined for this instrument. |
| FunctionaryFns | array of strings | The C code implementing the algorithm for each of the defined agents. Assumes the result in each will be placed in the predefined floating-point variable dQResult. Each array element corresponds to one agent, and the array size is always equal to nFunctionaries. |
| FunctionaryStrategies | array of strings | Provides a brief textual description of the value-setting strategy for each of the defined agents. Should observe a similar style and voice in this field for all agents. Note that, depending upon pedagogical considerations, additional information or additional fields could be defined for each agent. For example, if each agent should have an associated picture, a field could be added for picture filenames. |
| InitDefaultFaryIndex | integer | Indicates which of the automated agents will be in effect initially when the scenario begins. If the quantity is an external, the indicated agent will control the value selection throughout the entire scenario. |

FIG. 12B

| Field Name | Outcome Quantity Example |
|---|---|
| sName | "Unemployment Rate" |
| bInstrument | FALSE |
| sDefinition | "The Unemployment Rate is the percentage of the workforce that does not have gainful employment at a point in time. The workforce only includes persons who are willing and able to work.<br><br>$$$typical begin###<br>The unemployment rate can range from 2 percent to 30 percent. Higher rates are likely to lead to social breakdown.<br>$$$typical end###<br><br>$$$model Inflation and Unemployment###" |
| sUnit | 0.01 |
| dPlaceholder | 5.0 |
| sNewsFn | double dNatural = Value( "Natural Unemployment Rate" , -1 );<br>double dExcess = dNewValue - dNatural;<br><br>if ( ( dExcess > 2.0 ) && (dExcess < 8.0) )<br>{<br>  CString s; s.Format( "$$$def Your advisor###: Unemployment rate of %.1f is worrisome", dNewValue );<br>  AddNews( sQName,<br>    s,<br>    10,    // importance, scale 0-100 (default value is 1.0)<br>    2    // "can repeat after" (must wait 3 quarters before repeating)<br>  );<br>}<br>if ( dExcess >= 8.0 )<br>{<br>  double dImportance = 50;<br>  AddNews( sQName,<br>    "$$$def National Times###: Citizens desperate for relief from severe unemployment problem",<br>    dImportance,<br>    0<br>  );<br>} |
| LineColor | (24 24 24) |
| sNextValueFn | double dReal = Value( "Real Output", -1 );<br>double dPotential = Value( "Potential Output", -1 );<br>double dRatio = dReal / dPotential;<br>double dNatural = Value( "Natural Unemployment Rate", -1 );<br>double dLastUnem = Value( "Unemployment Rate", -1 );<br>double dTarget;<br><br>if ( dRatio <= 1.0 )  // under capacity<br>        dTarget = dNatural + ( 100.0 * (1.0 - dRatio) );<br>else<br>        dTarget = dNatural * ( 1.0 / pow( dRatio, 10.0) );<br><br>dQResult = dLastUnem + ( 0.75 * ( dTarget - dLastUnem ) ); |
| sNextValueDescr | "Computed as a function of the difference between $$$qty Real Output### and $$$qty Potential Output###. Unemployment is high when actual real output is less than potential, and the unemployment rate is low when actual is higher than potential. Greater differences between the two cause larger effects on unemployment." |
| sExplainNVFn | "Changes in unemployment result when there is a mismatch between output and the capacity of..." |

FIG. 13

| Fi ld Name | Instrum nt Quantity Example |
|---|---|
| sName | "Defense Expenditures" |
| bInstrument | TRUE |
| sDefinition | "Defense Expenditures is the total amount spent for our military, including salaries, equipment, weaponry, and other expenses.<br><br>$$$typical begin###<br>Defense expenditures may be zero, or may soar above 10 percent of $$$def total output\|total output### during wartime.<br>$$$typical end###" |
| sUnit | $1 Billion |
| dPlaceholder | 100 |
| sNewsFn | double lastAmount = Value( "Defense Expenditures", -1 );<br>double pctg = PercentChange( lastAmount, dNewValue );<br><br>if ( pctg > 10.0 )<br>{<br>  AddNews( sQName,<br>    "$$$def National Times###: $$$qty Defense Expenditures### increase dramatically ",<br>    LinearEffect( pctg, 5.0, 20.0, 10, 40 ),<br>    1 );<br>} |
| LineColor | (0 0 140) |
| bExternal | FALSE |
| sBoundsViolFn | if ( dProposedNewValue < 0.0 )<br>{<br>  bTooLow = TRUE;<br>  dValueLimit = 0.0;<br>  sExplanation = "Defense Expenditures cannot be negative.";<br>}<br>else if ( dProposedNewValue > Value( "Current Output", -1 ) )<br>{<br>  bTooHigh = TRUE;<br>  dValueLimit = Value( "Current Output", -1 );<br>  sExplanation = "Defense Expenditures cannot possibly be greater than total output.";<br>} |
| nFunctionaries | 2 |
| FunctionaryFns | *Automated Agent 1:*<br>double dLowerLimit = Average( "Current Output", -4, -1 ) * 0.02;<br>dQResult = max( dLowerLimit, Value( "Defense Expenditures", -1 ) * 0.98 );<br><br>*Automated Agent 2:*<br>double dUpperLimit = Average( "Current Output", -4, -1 ) * 0.10;<br><br>double dGrowthFactor = ( Value( "Price Index", -1) / Value( "Price Index", -2 ) ) * ( Value( "Potential Output", -1 ) / Value( "Potential Output", -2 ) );<br><br>dQResult = min( dUpperLimit, Value( "Defense Expenditures", -1 ) * max( 1.02, dGrowthFactor ) ); |
| FunctionaryStrategies | *Automated Agent 1:*<br>"We need to reduce our heavy spending on military expenditures so that we can focus our economy's resources more on the private sector. Advances in military technology have made it possible for us to do more with less."<br><br>*Automated Agent 2:*<br>"We need to build up our defense capabilities. It's an increasingly dangerous world out there, and our weapons systems are getting old." |
| InitDefaultFaryIndex | 0 |

COMPUTER-BASED LEARNING ENVIRONMENT UTILIZING QUANTITATIVE MODEL-BASED SIMULATIONS

FIELD OF THE INVENTION

The present invention relates to interactive educational systems and to methods of teaching about complex systems by using computer-based simulation environments.

BACKGROUND OF THE INVENTION

Many interactive learning systems have advantageously been developed for education and training. Such interactive programs: (1) are easily reproduced and distributed; (2) can be worked on at the student's or learner's own pace; (3) permit non-linear exploration of the available material; (4) can automatically provide immediate feedback for learners' actions and decisions; and (5) allow response attempts in private without fear of embarrassment.

Recently, many education and cognitive science researchers have argued for the superior results of "problem-based" educational approaches, where students are given rich problem-solving scenarios rather than static, expository material or simple drills. Interactive computer-based implementations of this problem-based approach have generally been referred to in the market as "simulations." There are several different kinds of educational simulations.

The vast majority of these simulations are "branching" simulations, where all possible states within the scenario have been predefined, and branching from one state to another depends upon the actions and choices made by the student. The branching may either be hard-coded in the software or may use a more generalized, data-driven branching engine.

Another type of educational simulation is comprised of a quantitative domain model that is executed dynamically and iteratively. The student's actions or choices provide inputs to the model which affect the subsequent values and states of different quantities within the model. By this means, activities, causes, and effects within a scenario can be realistically simulated. With quantitative model-based simulations, the number of possible states can be effectively infinite. The present invention is only concerned with this latter type of educational simulation.

Quantitative domain models are commonly used in research and for forecasting, in domains ranging from economics and business, to chemistry, biology, and medicine, to mechanical and electronic systems. But their usability for educational purposes is limited. Except when the number of variables in a model is very small or when there is little interaction between different entities in a model, these simulation models are overwhelming to typical students. Moreover, the user interfaces for the models typically also lack user-friendliness.

Yet their potential for teaching students about the structure, characteristics and behavior of complex systems is very great. Domain models embody highly-refined knowledge in an explicit and illuminating form. Students could become engaged in experimentation, trying their own hypotheses, and watching firsthand as the interplay between different entities unfolds.

There are several difficulties students face when interacting with a quantitative model-based simulation. Students may not be able to relate bare numeric outcomes to relevant theoretical concepts. Students also typically do not know what many of the quantities or variables in the model mean, or what is their significance, or specifically which other quantities affect them. Students are also prone to cognitive overload as they try to analyze the effects of several different inputs to the simulation model.

Each of these difficulties ruins the students' experience and/or causes them to become discouraged. The difficulty of creating interactive environments that overcome these challenges for students has prevented the proliferation of this potentially-valuable educational approach. It's not only that development of quantitative model-based simulations is complicated and expensive, and requires a great deal of expertise, and that existing development tools are inadequate. More importantly, it is that there has been a lack of ideas and design strategies for enabling students to effectively deal with the complexity in such simulations.

SUMMARY OF THE INVENTION

According to the present invention, a system and method for providing an effective learning experience centered around a quantitative model-based simulation is disclosed. The system provides the student or learner with an interactive learning environment on a computer. The learning environment contains an executable quantitative model, consisting of a set of defined variables or entities or quantities whose values are updated according to defined algorithms with each successive execution of the model. The learner engages in an iterative process of reviewing the current state, choosing actions and/or "instrument" values, executing the model, and then reviewing the updated state and repeating the process.

The learning environment also provides a user-friendly means for selectively reviewing current and prior numeric values for different quantities or variables in the model.

The learning environment also provides an automated means for presenting qualitative descriptions of various state changes so that learners can more easily relate quantitative outcomes to relevant theoretical concepts.

The learning environment also provides a means for the learner to immediately obtain, for any defined "outcome" quantity in the simulation model, a description of the quantity and a description of the internal algorithm used to compute the quantity's value during each execution of the simulation model.

The learning environment also provides a means for managing the control of "instrument" quantities which influence simulation model outcomes. Learners use this means to selectively control instrument quantities or delegate control of them to automated agents, so that learners can more effectively manage their own cognitive load. With this means they can methodically narrow their focus on specific parts of the simulation model rather than having to simultaneously manage all or several instrument quantities. Scenario designers use this means to selectively limit the set of instrument quantities that will be accessible to learner control within a particular scenario, in order to optimize the learner's experience with respect to specific teaching objectives.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 depicts the successive states in a quantitative model-based simulation;

FIG. 6 illustrates a display showing all quantity values for a specified period in the interactive learning environment;

FIG. 11 illustrates a display showing a development tool for editing the quantitative model and for assignment of quantity properties;

FIG. 12A is a table listing the fields in a quantity data structure that are common to all quantities;

FIG. 12B is a table listing the fields in a quantity data structure that are specific to outcome quantities and the fields in quantity data structure that are specific to instrument quantities;

FIG. 13 is a table showing the data fields for a particular example of an outcome quantity;

FIG. 14 is a table showing the data fields for a particular example of an instrument quantity;

Figure 23:
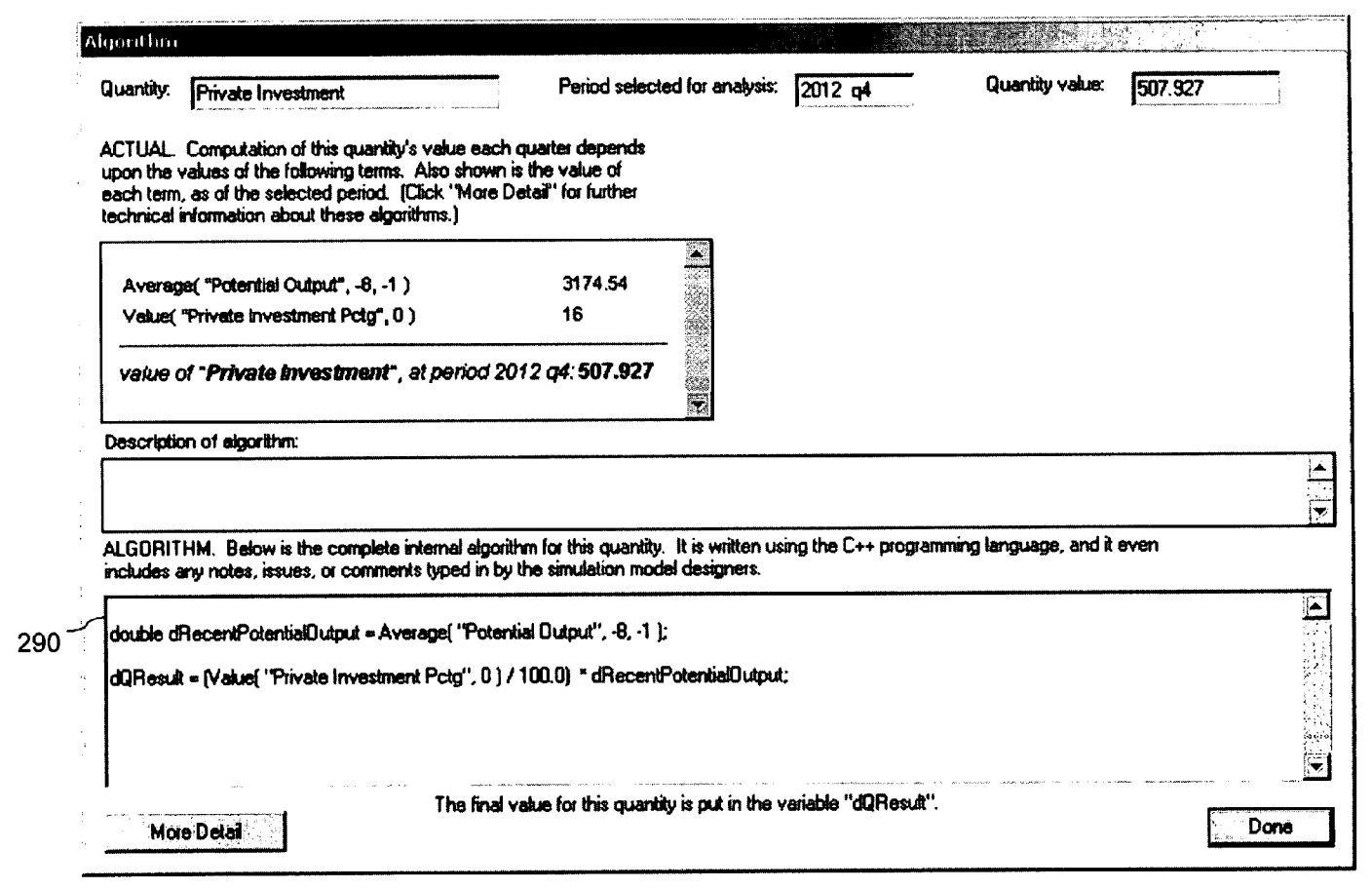

FIG. 23 illustrates a display showing a dialog that shows the source code for an outcome-quantity algorithm in the interactive learning environment;

FIG. 24 illustrates a display showing a dialog for editing condition tests for qualitative summaries of model states.

DETAILED DESCRIPTION OF THE INVENTION

1. Overview of Computer System

Figure 1:
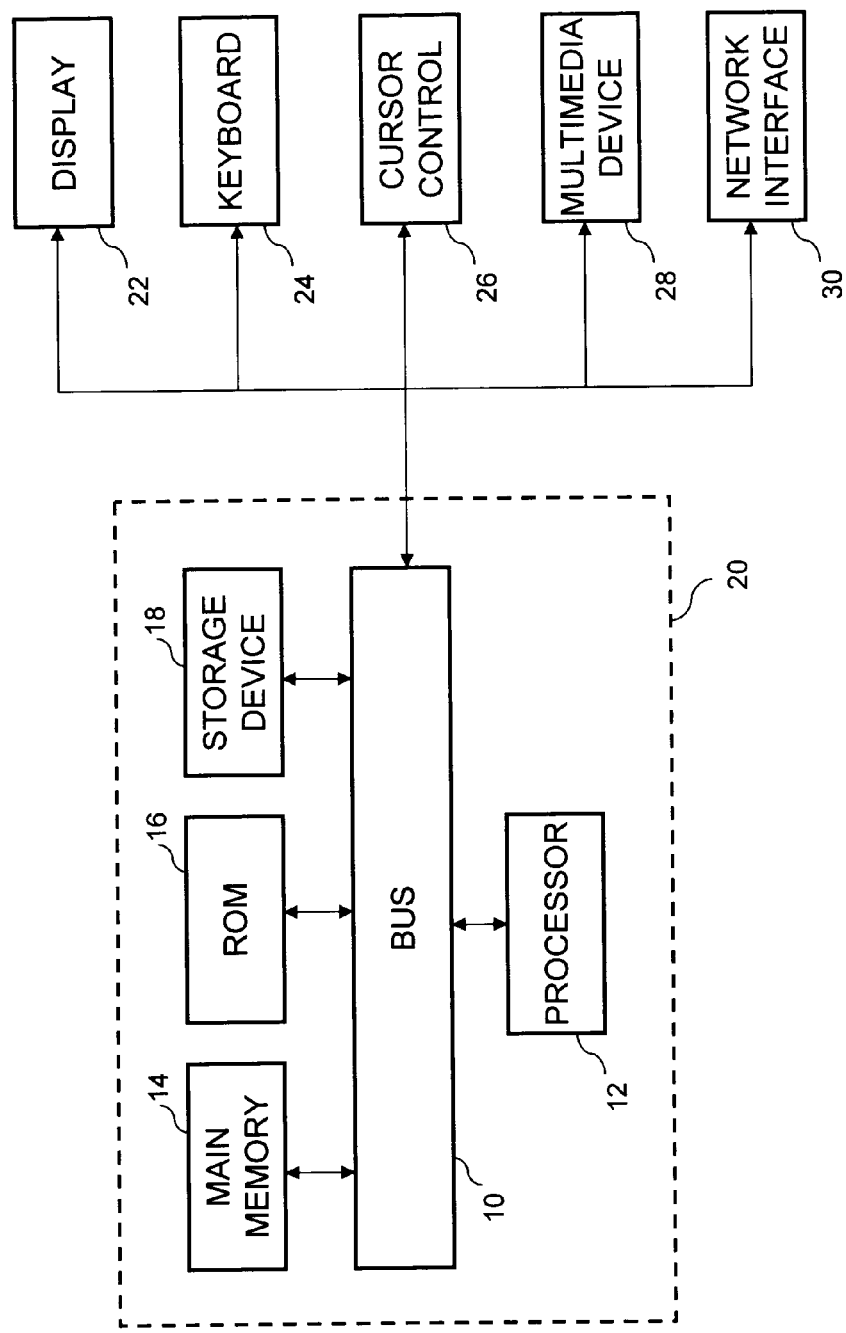
FIG. 1 is a block diagram of a representative hardware configuration.

A preferred embodiment of a system in accordance with the present invention is practiced in the context of a personal computer or workstation with an operating system providing a graphical user interface. The computer is used both by designers for creating interactive simulations with specialized software development tools including the one that is described later, and by learners for executing the interactive simulations. Referring to FIG. 1, depicted is a block diagram of such a personal computer. The computer (20) consists of a bus (10) or other communication mechanism for communicating information, and a processor (12) coupled with the bus for processing information. The computer further comprises a random access memory or other dynamic storage device (14), coupled to the bus (10) for storing information and instructions to be executed by processor (12).

The computer also comprises a read-only memory (ROM) and/or other static storage device (16) coupled to bus (10) for storing static information and instructions for processor (12). A data storage device (18), such as a magnetic disk or optical disk and its corresponding disk drive, can be coupled to bus (10) for further storage of information and instructions.

The computer (20) can also be coupled via bus (10) to a display device (22), such as a cathode-ray tube or flat-panel display, for displaying information to a learner. The computer further includes input devices, for example, a keyboard (24) and a pointing or cursor control device (26), such as a mouse. In addition the computer includes a multimedia device (28), such as a CD-ROM drive or DVD drive. Finally, the computer may be connected to a network, via a network interface device (30).

The present invention is related to the use of the computer (20) for interactive simulation-based education. According to one embodiment, education is performed by the computer in response to processor (12) executing sequences of instructions contained in memory (14). Such instructions can be read into memory (14) from another computer-readable medium, such as data storage (18). Execution of the sequences of instructions contained in memory (14) causes processor (12) to perform the process steps that will be described hereafter. In alternative embodiments, a game console connected to a monitor, or a distributed computer system that performs processing of instructions on two or more computers in coordinated fashion, may be used in place of the computer that has been described. Thus, the present invention is not limited to any specific computer architecture.

2. Simulation Models

In an embodiment of this invention, a quantitative model is used to represent a particular system in a particular domain. A model has a set of defined entities, variables and quantities whose numeric values are updated with each execution or run of the simulation model. Since some of the numeric values may be in fact be constants, throughout the rest of this description the term "quantity" will be used to refer to any entity defined in a model that can have a numeric value, regardless of whether the value is variable or constant.

Each execution of the simulation model represents an advance in time of some time period. The new values for the set of all quantities in the model represents the state of the system at the end of the time period. Each time period thus has its own separate set of numeric values, as depicted in FIG. 2.

In an embodiment of this invention, two basic types of quantities in any model are (1) "instrument" quantities and (2) "outcome" quantities. In simple terms, an instrument quantity can be manipulated to affect the behavior of the simulated system, and outcome quantities represent all the mechanical "effects" in the system through time. The value of each outcome quantity may depend upon the values of other instrument and outcome quantity values, and each outcome quantity has its own algorithm for computing its value during each execution of the model.

Figure 3:
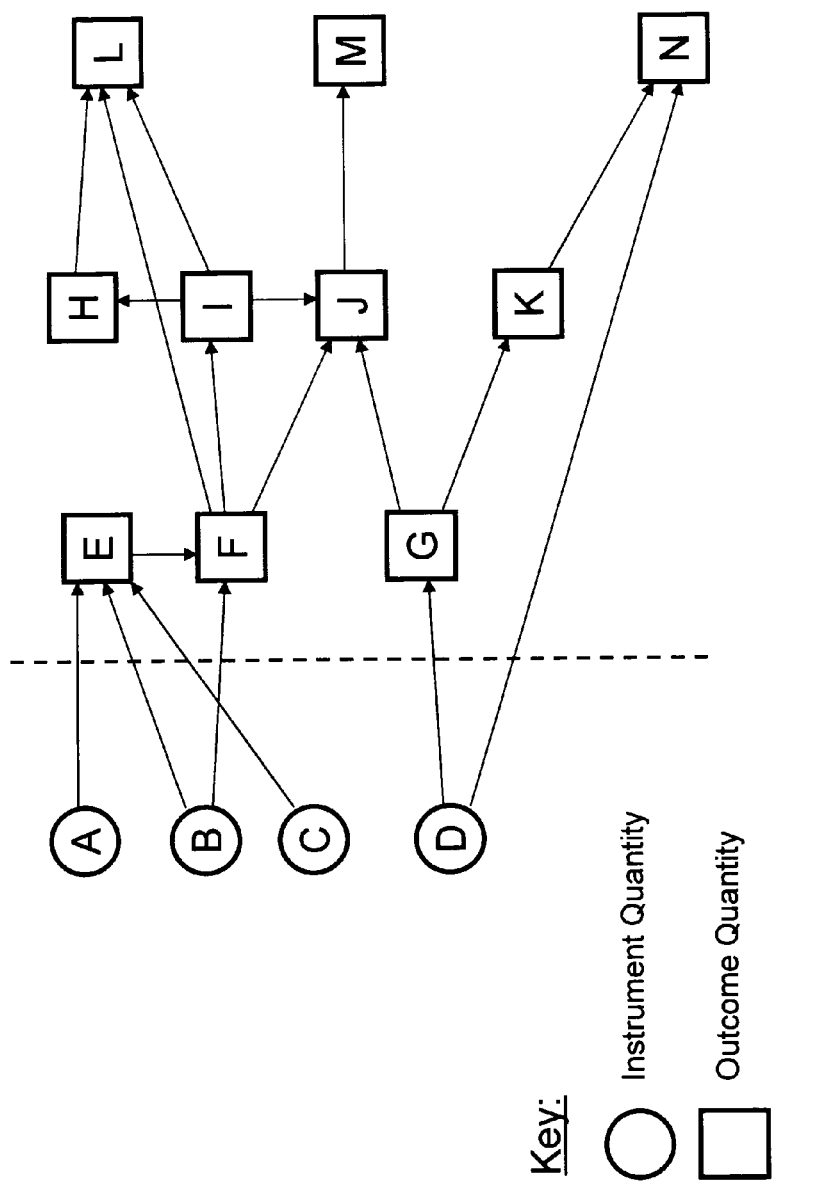
FIG. 3 depicts a small portion of a hypothetical domain model.

Conceptually, the values of instrument quantities are determined "outside" of the domain model, and the instrument quantities' values have effects on various entities in the domain model which are represented by outcome quantities. For example, in a simulation of an island ecosystem, climate changes could have effects on entities within that ecosystem even though the ecosystem model does not include a global meteorological model for determining climate; the values of instrument quantities representing climate variables could, for instance, be chosen each period by the learner. FIG. 3 depicts a small portion of a domain model, showing how the values of specified quantities affect the values of outcome quantities. If, in our example, climate was represented by instrument quantity D in FIG. 3, changes in climate could affect outcome quantities G, J, K, M, and N, which in turn might represent such things as the prevalence of certain plant or animal species.

The new value of an outcome quantity may depend upon values of other quantities in the same period, and may also depend upon the values of quantities in prior periods. In an embodiment of this invention, the algorithm for each outcome quantity is specified by the designer with a code segment using the C programming language, and several functions are provided for obtaining quantity values. The most basic such function, Value, obtains a value of a specified quantity at the end of a specified time period. Here is the basic form for all programmed calls to the Value function, which has two parameters:

Value(<quantity name>, <period offset from current>)

For example, to assign the current-period value of the quantity named Fed Funds Rate to the double-precision floating-point variable named dFFR, as part of an algorithm to compute some outcome quantity, one would use the following program code:

double dFFR = Value("Fed Funds Rate", 0);

As another example, double dLastFFR = Value("Fed Funds Rate", −1);

obtains the value that the same quantity had in the previous period.

Other useful functions such as Average, Sum, Maximum, Minimum, and Trend can be provided to obtain values derived from several prior periods. For example, Average("Fed Funds Rate", −4, −1)

collects the values of the Fed Funds Rate in the four most recent periods and returns their average. This recent average value of the Fed Funds Rate might be used in a macroeconomic model to influence various outcome quantities in the model.

Following is a simple example of a code segment used to implement the algorithm for computing the new value for a particular outcome quantity, in this case, total income tax receipts. By convention, the value result is placed in the predefined floating-point variable "dQResult". In this example, the outcome quantity's new value is computed by (1) finding the average of the Nominal Output over the past four periods, and (2) multiplying that average by the previous period's Individual Tax Rate (converted from percentage terms).

double drecentOutput = Average("Nominal Output", −4, −1);

dQResult = dRecentOutput
* (Value("Individual Tax Rate", −1) / 100.0);

After the total income tax receipts is computed, other outcome quantity algorithms are also executed, some of which might use or be influenced by the new value of this outcome quantity.

Because of the generality of the C programming language and similar programming languages, the code segments may contain temporary variables, conditional statements, and other constructs. Specialized mathematical software libraries can also be accessed with standard C function calls. In an alternative embodiment, those skilled in the art will recognize that the algorithms could also be specified using a visual or icon-based programming environment. In an alternative embodiment, the range of allowed programming language features and functions could be intentionally restricted for engineering or pedagogical reasons.

So each time the simulation model is run: a data structure for the new period is created; the algorithms for each of the outcome quantities are executed; and the set of new values is recorded in the data structure.

3. Overview of Interactive Learning Environment

Figure 4:
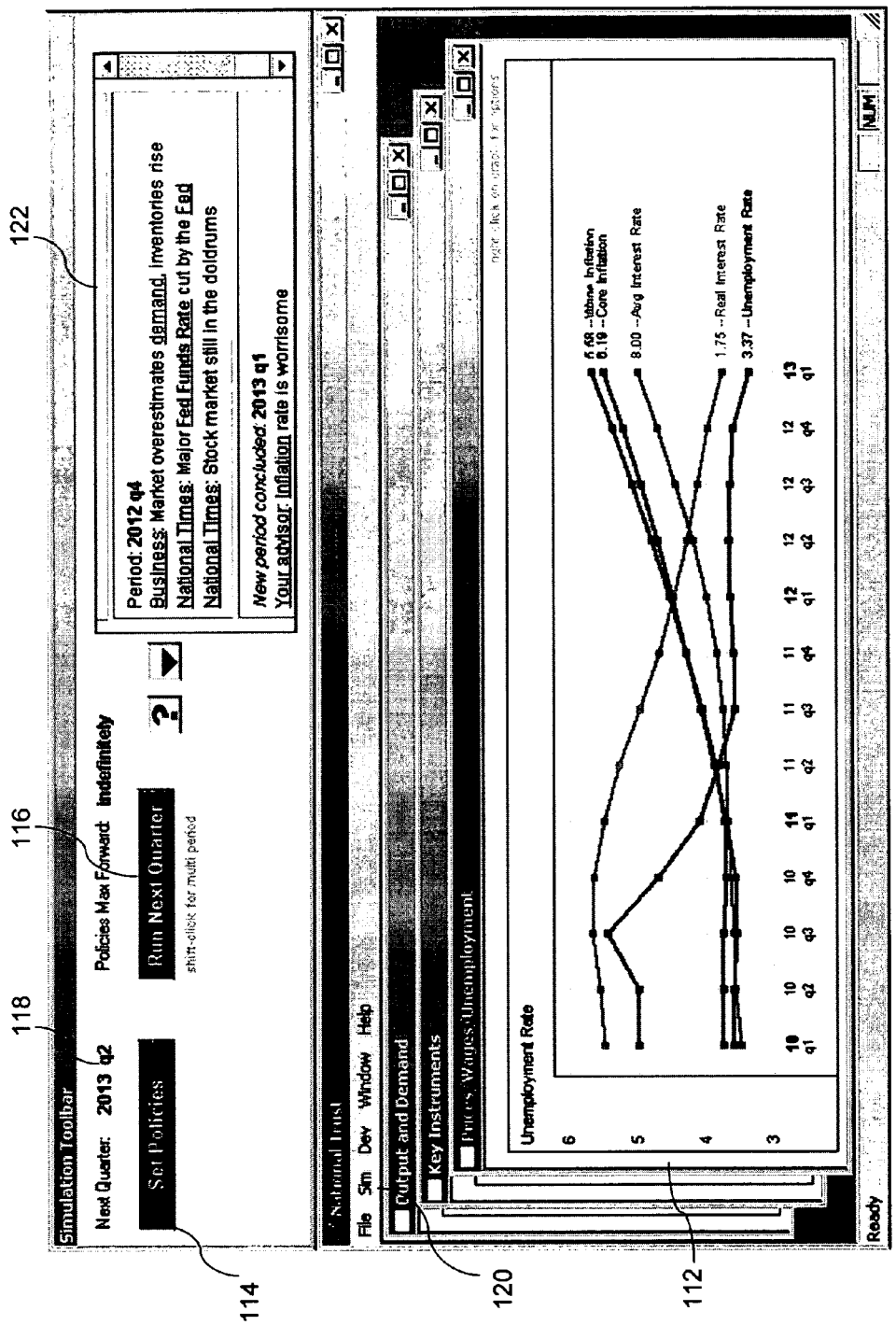
FIG. 4 illustrates a display showing the interactive learning environment.

In a preferred embodiment of the invention, the interactive learning environment used by the learner provides a graphical user interface that allows the learner to experiment with the quantitative model and study its behavior. FIG. 4 shows the environment with an example of a scenario in the domain of macroeconomics. The ordinary artisan would understand that what is described is particular to the macroeconomics example and that other descriptions would be necessary for other types of domains such as chemistry, mechanics, and so forth. In this particular macroeconomics model, each time period corresponds to one quarter, that is, three months time.

Figure 5:
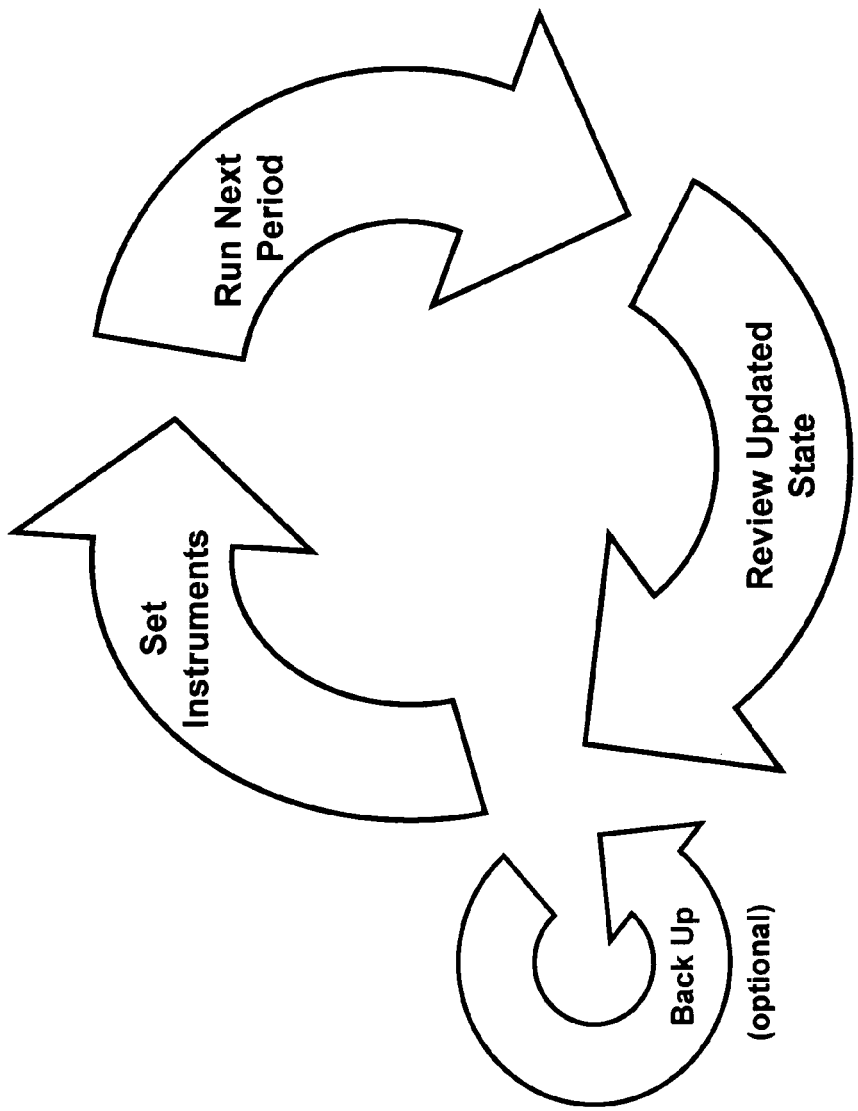
FIG. 5 depicts the learner's basic interaction cycle.

FIG. 5 depicts the learner's basic interaction cycle. The learner reviews the current state of the scenario by looking at the current and prior values of various quantities. Then the learner makes decisions about the next-period values for the instrument quantities in the model. When all such decisions are specified, then the learner executes the simulation model, and reviews the new state of the scenario. If the learner so desires, for example if the learner is dissatisfied with the outcomes, the learner may rewind or "back up" the simulation to the prior period and make different decisions about the instrument values. Otherwise, the learner makes decisions about the instrument quantities for the following period.

Referring again to FIG. 4, the learner can look at the values of different quantities in child windows that are referred to as Quantities Groups (112), and by other means that will be described. To make decisions about next-period instrument values, the learner clicks the Set Policies button (114), and to run the simulation, the learner clicks on the Run Next Quarter button (116). After the Run Next Quarter button is clicked, all Quantities Group windows (112) and a static text control indicating the current period (118) are automatically updated. Also updated is a scrolling window (122) that reports certain qualitative summaries for the most recent period, which will be described later.

The learner can review quantity values by several different means. By selecting an option under the Sim menu (120), the learner is shown the dialog window depicted in FIG. 6. The dialog displays a list (142) of all quantities in the model and their values as of the current period. By selecting a different period from the drop-down list (140), the learner can see the list of all quantity values for any other selected period.

Figure 7:
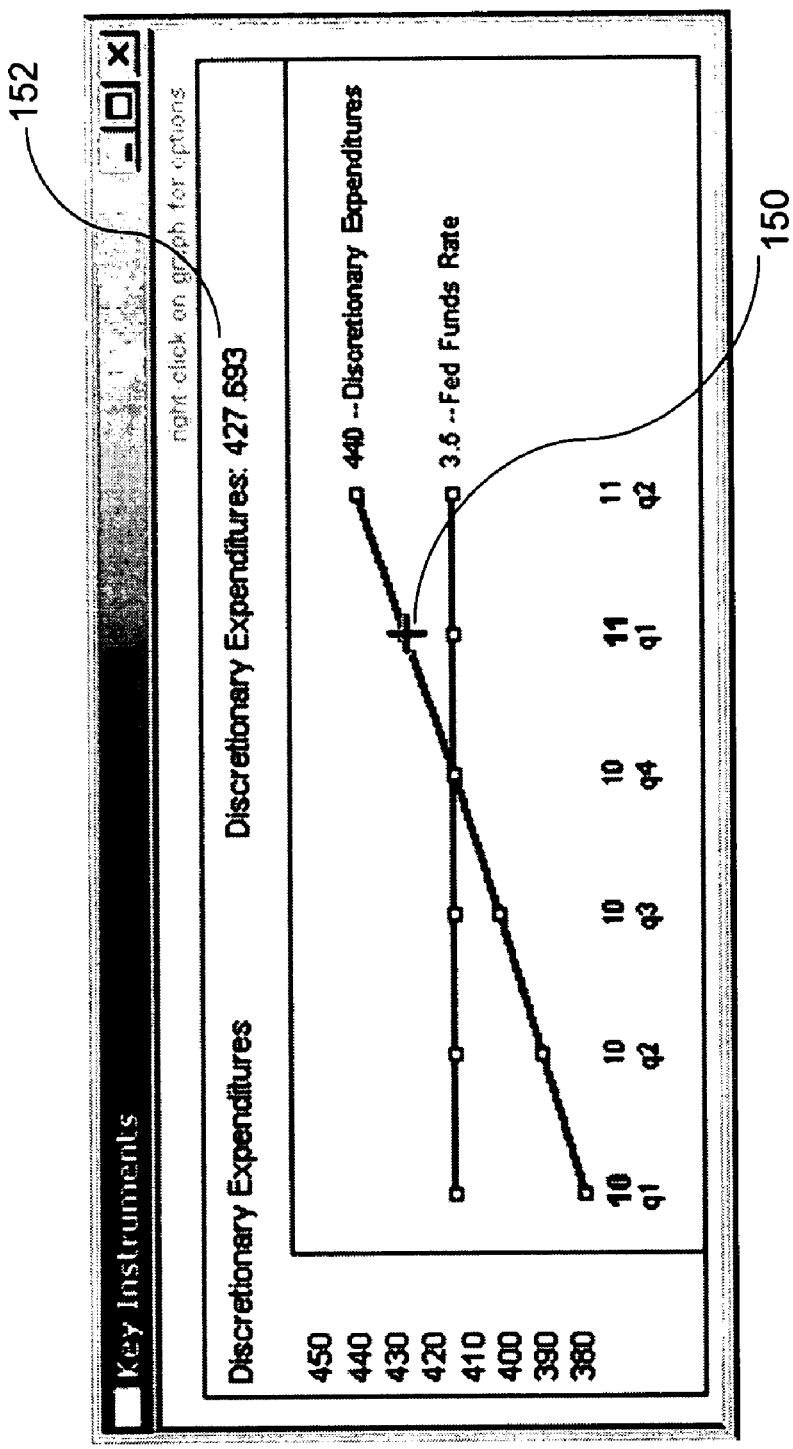
FIG. 7 illustrates a display showing a Quantities Group window with the crosshair cursor positioned over a point on a quantity graph line in the interactive learning environment.

In addition, in a Quantities Group window the learner sees the values of selected quantities over time in the form of time-series graphs. As depicted in FIG. 7, the cursor (150) changes from an arrow to a crosshair whenever the learner uses the computer's pointing device to move it to any position over a quantity graph line. And while the cursor is positioned over the line, the value of that quantity for the indicated period is shown above (152). The learner can easily add or subtract particular quantities from a Quantities Group, and can also create additional Quantities Group windows and include any desired sets of quantities in them. Options are also provided for changing the vertical graphing scale for different quantities, and temporarily hiding specified quantities in a Quantities Group.

In addition, if the learner selects another option labeled "Copy Values to Excel" in the Sim menu (120), all quantity values in the active Quantities Group window for all periods are copied, in tabular form, onto the system clipboard. The learner then may, if desired, directly paste the array of values into other applications, such as Microsoft Excel, for further analysis, display, or manipulation.

In summary, several different easy, user-friendly ways are provided for the learner to review any or all of the numeric data in the model.

4. Overview of Setting Instrument Quantities

Figure 8:
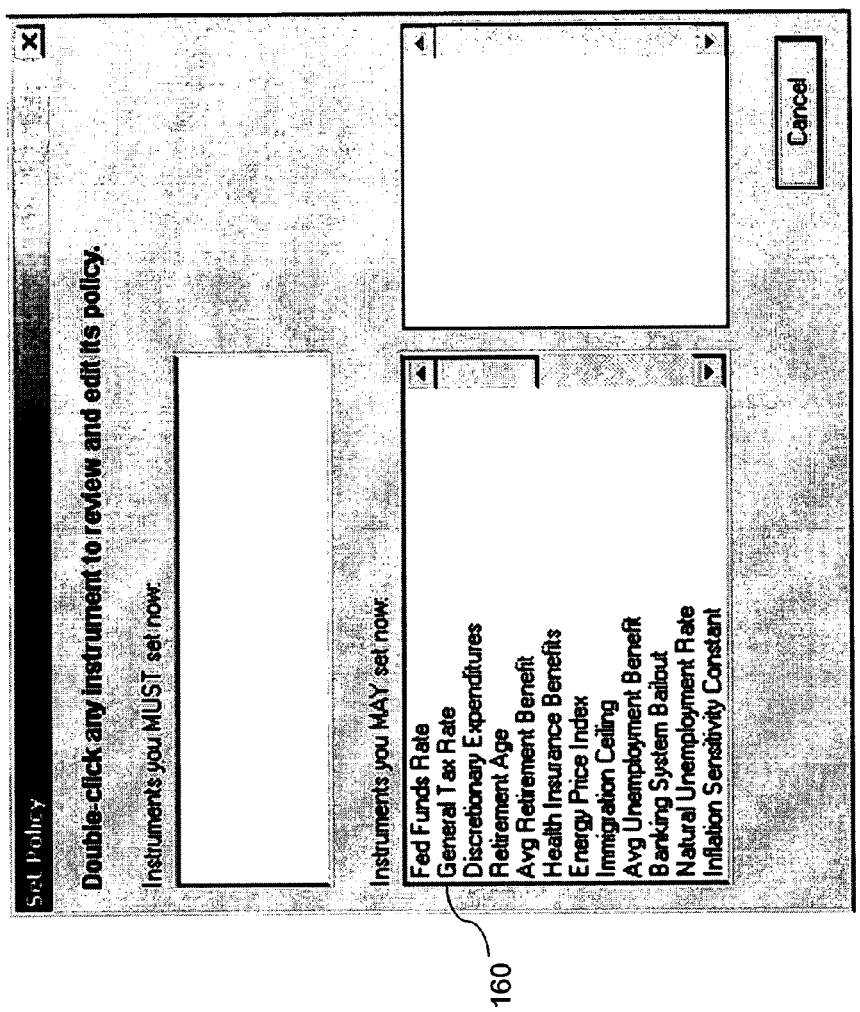
FIG. 8 illustrates a display showing a dialog for selecting an instrument quantity for policy-setting in the interactive learning environment.

Each period, the learner makes decisions about the values of instrument quantities for the next period. When the learner clicks the Set Policies button (114), the dialog depicted in FIG. 8 appears. The dialog contains a list (160) of instrument quantities. If the learner were to double-click on the list item Fed Funds Rate, a dialog resembling FIG. 9 appears.

There are two different ways that the learner can control instrument values: the learner may (a) specify exact numeric values, or (b) assign control of an instrument to an automated agent. An agent is a pre-programmed algorithm crafted by the designer that accesses the current state of the simulation and strategically "selects" new values for an instrument quantity. These two alternatives correspond to the two tabs (170, 172) in the dialog. If the learner clicks on the Set My Own Values tab (170), the dialog changes appearance as shown in FIG. 10.

Figure 10:
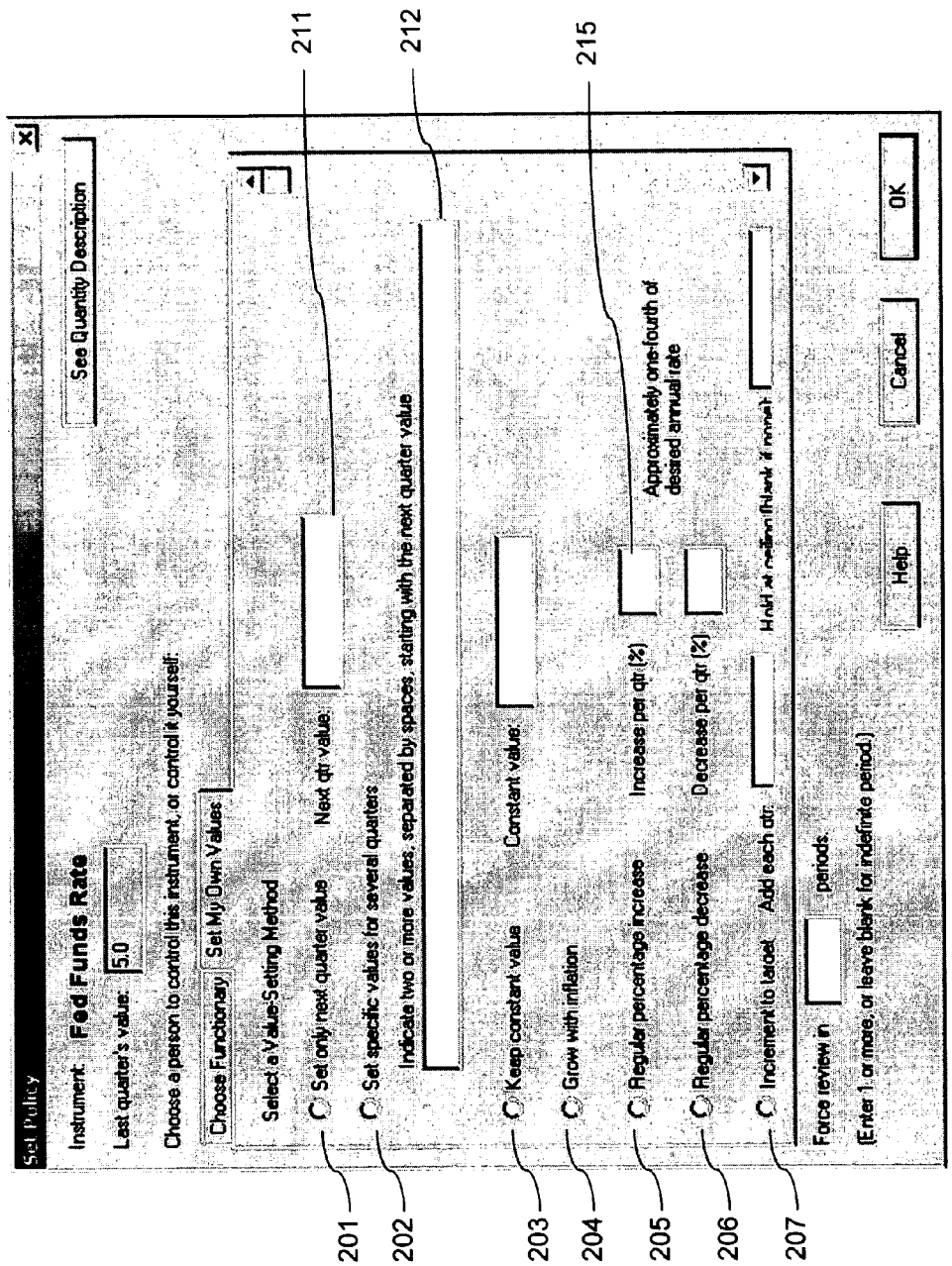
FIG. 10 illustrates a display showing a dialog for choosing specific numeric values for an instrument quantity in the interactive learning environment.

As depicted in FIG. 10, several different methods are provided for learners to specify their own specific numeric values. To select a value-setting method, the learner clicks on the appropriate radio button (201-206) and provides any additional required information. Just three value-setting methods are described here.

The simplest method is to specify the exact value only for the next period. To do this, the learner would click the first radio button (201), and then would enter a number, such as "5.5" into the adjacent text box (211). The next time the simulation is executed, then, the instrument quantity Fed Funds Rate would be assigned the value 5.5, and then the learner would be required to again specify a new value for the following period.

A second method is to specify values for a series of periods. For example, suppose the learner clicked the second radio button (202) and entered "5.5 6.0 7.0" into the adjacent text box (212). The next time the simulation is executed, the quantity Fed Funds Rate would be assigned the value 5.5, but now the learner would not be required to specify a new Fed Funds Rate value for the following period unless the learner so desired. If the learner does not change the instrument-setting policy, then the value for the Fed Funds Rate for the following period would be 6.0, and for the period after that would be 7.0. At that point, however, the learner would be required to specify a new Fed Funds Rate value for the following period.

A third method is to specify a simple rule that is applied each new period to determine the next value for the instrument. For example, if the most recent Fed Funds Rate value was 5.0, and the learner clicked the fifth radio button (205) and entered "10" into the adjacent text box (215), then the next time the simulation is executed, the Fed Funds Rate would be set to a value that is 10% greater than its last-period value, in this case, to 5.5. This rule would be reapplied every successive period until the learner changed the policy. The following period value would be 6.05, then 6.655, then 7.320508, and so on.

Rather than specifying numeric values, the learner may also delegate control of any instrument to an automated agent. An automated agent contains its own algorithm for strategically selecting a next value for an instrument, based upon the then-current state of the system. The algorithm can be fairly simple, for example, small incremental increases up to some computed ceiling value, or a fixed percentage of some other quantity in the model. Or the algorithm can be very complex, for example, appraising the values of many different quantities in the model, performing extrapolations or projections, and applying expert knowledge about the entire model to try to nudge outcomes values toward some desired state or condition.

Depending upon pedagogical considerations, the kind of information given to the learner about the agent's algorithm could either be very little or very much. At one extreme, the learner could be given no hint about how an agent will select values for the instrument, and the learner would simply have to observe its behavior over time to decide whether its value selections seem reasonable or useful to the learner. At the other extreme, the learner could be shown the details of the entire agent algorithm, perhaps even augmented by helpful documentation, examples, or visual illustrations of the computation strategy.

Figure 9:
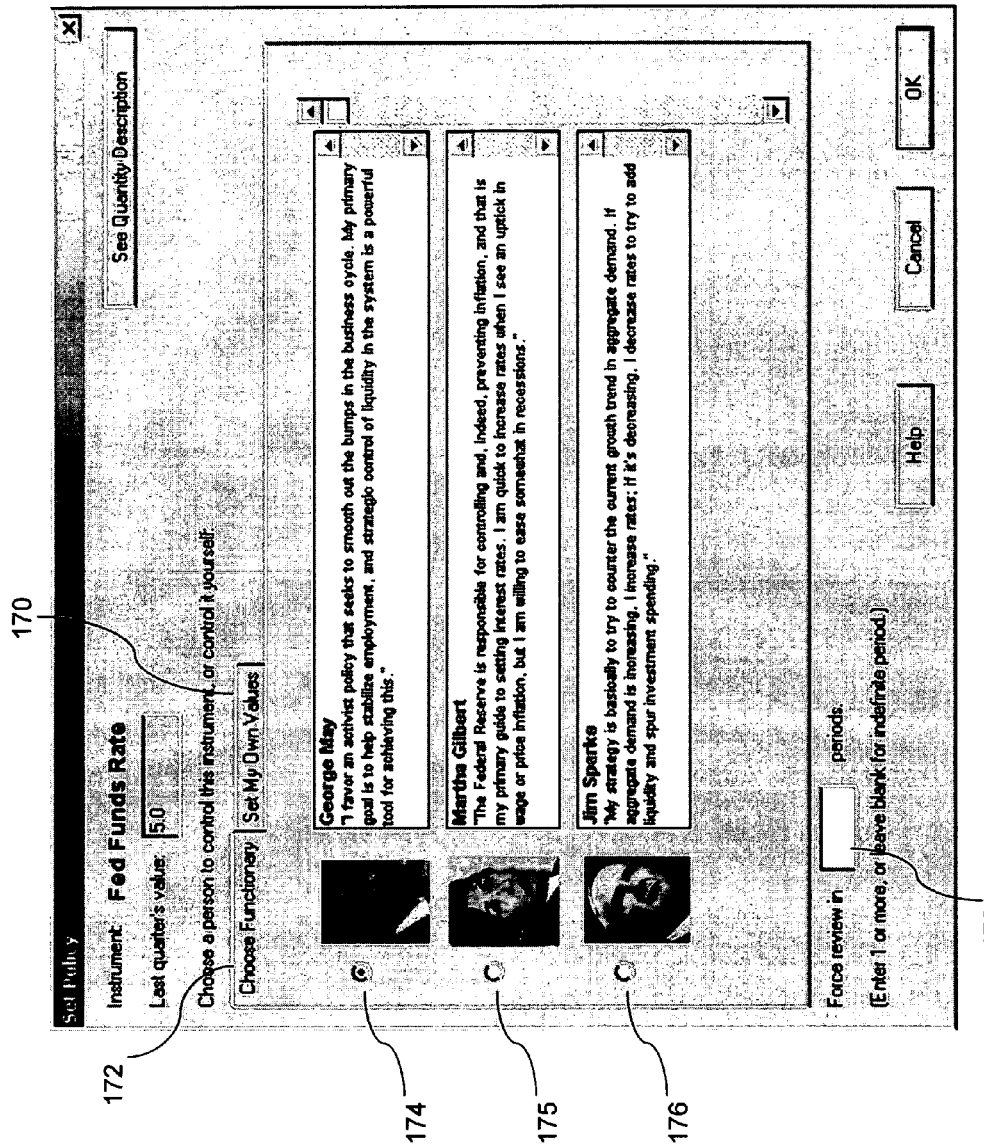
FIG. 9 illustrates a display showing a dialog for choosing an automated agent to manage an instrument quantity in the interactive learning environment.

In our example, the automated agents available to the learner are called "functionaries." If the learner clicks on the Choose Functionary tab (172), the dialog again appears as in FIG. 9. Here, the learner may select any one of the three available agents in the choice set by clicking the appropriate radio button (174-176). Here we see that each automated agent has just a short textual description that is merely suggestive of the strategy that the agent uses in selecting a new value each period for the Fed Funds Rate instrument. In this embodiment, a learner cannot accurately predict the exact values that any of these three agents will choose in a given situation, but each at least gives a hint about what factors and quantities play a significant role in their value-choosing algorithms.

The strategies created for different agents should be designed with pedagogical considerations primarily in mind. ("Pedagogy" is the term commonly used to refer to the art of effective instructional design.) For example, for pedagogical reasons, it could sometimes be acceptable to include an agent that has an algorithm that intentionally selects values which are likely to cause the system to go into undesirable states. This could be done, for example, to encourage the learner to select their own numeric values, or to provide a contrast with other algorithmic strategies, or to attack common learner misconceptions. It is important to note that an automated agent does not necessarily have to anthropomorphized; for example, an agent could simply be referred to as "Strategy 1" or "Program A."

When an automated agent is selected by the learner to control an instrument, the agent will continue to be used period after period until the learner changes the policy. The learner does, though, have an option of forcing a review of an instrument-setting policy after a specified number of periods. For example, suppose the learner entered "10" in the Force Review text box (178). Then, after 10 more periods execute, the simulation environment will not permit another execution of the simulation until the learner (a) selects the instrument again for a policy-setting decision, (b) reviews the value-setting method in effect, and (c) either changes it or renews it.

Because of the availability of these various value-setting methods, the learner is not required to select a new value for every instrument quantity in every period. The learner may use value-setting rules or automated agents for various instrument quantities, and can allow them to remain in place for multiple periods.

If all of the instrument quantities are appropriately set up with rules or agents, it is possible to run several executions of the simulation in quick succession, that is, to run several time periods, without having to review or change the instrument-setting strategies in between each execution. An option in fact is provided for running the simulation a specified number of iterations, without having to click the Run Next Quarter button (116) every time; if there is a Force Review or other issue that prevents the simulation from executing the full number of iterations requested by the learner, the learner receives a notification message. There also is a parallel option for backing up/rewinding the simulation by multiple periods.

This capability lets the learners try a greater variety of experiments in a shorter amount of time. More generally, the automated agents serve to reduce the learner's cognitive load and allow them to focus more attention and finer control over the instrument quantities of their choosing.

It can be pedagogically advantageous if, at the beginning of a scenario, every instrument starts off having an agent selected for its value-setting policy. This allows the learner to execute the model immediately and gain initial familiarity with the behavior of various outcome quantities in the model. And, again from a cognitive load standpoint, it lets the learners experiment with one new instrument at a time, rather than having to select specific values for many instruments before being able to do anything else.

5. Overview of Development Tool

In an embodiment of the invention, a specialized development tool is used by the designer to define all quantities in a model. The tool is used to specify the algorithms for all outcome quantities, and to specify several behaviors and properties of outcome quantities and instrument quantities, which will be described. The tool is domain-independent, that is, many different, unrelated domain models can be developed using the same tool. In an embodiment of the invention, the tool was developed with C++. Although the example was developed using C++, the ordinary artisan understands that any programming language can be used to developed a learning simulation according to the invention.

In an embodiment of the invention, the tool is used both for development of the quantitative model and for assignment of properties relevant to the interactive learning environment. To effectively develop using this tool, a designer must have some programming ability as well as domain-modeling skills. In an alternative embodiment, separate tools could be used for model development and for assignment of properties relevant to the interactive learning environment.

Figure 11:
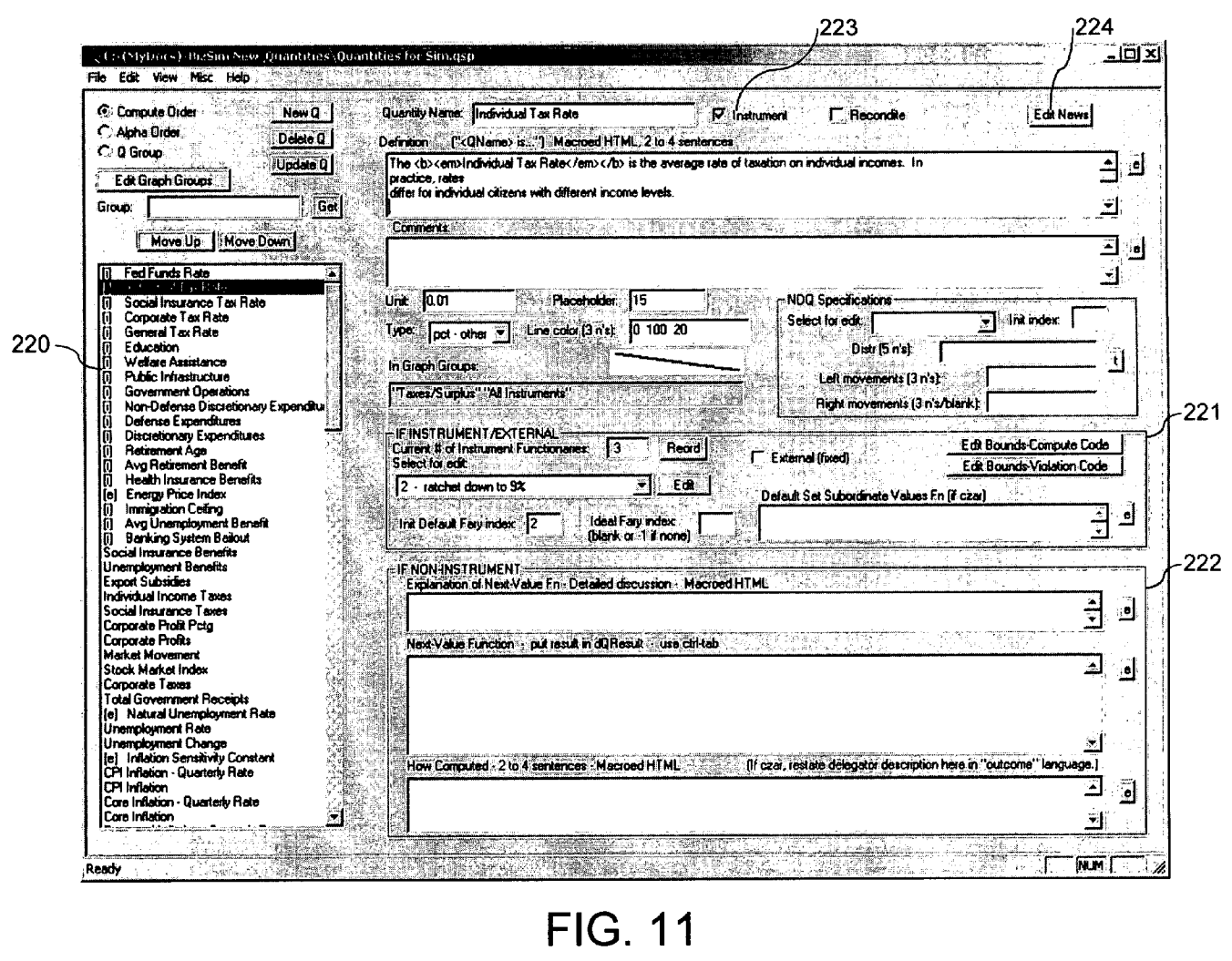

FIG. 11 illustrates the main interface for a development tool, again with a macroeconomics model as an example. The left side displays a list (220) of all defined quantities in the model, and the right side is used for editing data fields associated with the quantity that the designer has selected for editing. A quantity is selected for editing by clicking on its name in the list. When the designer clicks on a quantity, all of the field information associated with that quantity immediately fills up the edit boxes and other controls on the right side.

The order in which quantities appear in the list is the "compute order," the order in which outcome quantity algorithms are run during an execution of the simulation model. Thus, if one outcome quantity depends upon the same-period value of a second outcome quantity, the second quantity must appear earlier in the list than the first quantity. Circular dependencies are not allowed.

The right side has three editing areas. The topmost fields apply to all quantities. The middle section (221) has fields that are only applicable for instrument quantities, and the bottom section (222) contains fields that are only applicable for outcome quantities. Whether a quantity is an instrument or an outcome is indicated by the Instrument check box (223). Further description of these areas will be given below.

The tables in FIG. 12A and FIG. 12B list the key fields in a quantity data structure. FIG. 12A lists the fields that are common to all quantities. FIG. 12B lists those fields that are specific only to outcome quantities and fields that are specific only to instrument quantities.

FIG. 13 has an example of a particular instance of an outcome quantity, showing the data in the relevant fields.

Similarly, FIG. 14 shows an example of a particular instance of an instrument quantity.

In the embodiment shown, whenever a domain model and all of its quantities are saved to disk by the designer, another important file-generation process also takes place. Several C++ source code files are automatically generated by the tool, incorporating the C code fields in the quantity data structures. And these source code files are then used in a subsequent compilation step with the interactive learning environment. Three source code files are generated:

1. A source file containing code for validating instrument values, using the sBoundsViolFn fields from all defined instrument quantities;
2. A source file containing code for computing new quantity values, using the fields sNextValueFn and FunctionaryFns from all quantities; and
3. A source file containing code for collecting qualitative summaries of state changes, using the sNewsFn fields from all quantities.

For models having more than a handful of quantities, this approach is vastly superior to an approach in which the source code files are edited manually. As the number of quantities grows, finding the fragment of code relating to a particular quantity would become increasingly difficult. During model development and debugging, it is frequently necessary for the designer to jump around quickly to examine different parts of the code, and this would become increasingly slow and impractical. Also, keeping the different source code files in sync with each other would be increasingly laborious.

As will be seen later, another advantage of this approach is that it allows the designer, where appropriate, to show parts of the algorithmic code to learners, without having to maintain two separate copies of the algorithmic code and keep them in sync.

Note that interactive educational systems like the present invention have not been developed in the past because they would be practically impossible without the assistance of specialized development tools such as this one. But instructional developers generally do not have the skills to design and build such a tool, and commercially-available authoring tools are not sufficient for development of this kind of simulation. Though it might theoretically be possible for an expert programmer to create an appropriate development tool "on top of" one of those authoring tools.

The development tool and interactive learning environment implement the well-known design principle of "separating code from content," also called "separating pedagogy from content," which improves the extensibility, maintainability, and flexibility of software systems. But it takes it to another level by not only separating out inert content, but also separating out key pieces of functionality in the form of code segments. This modularity makes it possible to swap in different models, quantities, and behaviors without having to modify any of the core program.

In an alternative embodiment, the C code fields that are in the quantity data structures would be fully tokenized and parsed, and each of those processed code segments would be stored in a specialized internal representation. Then, at run time a specialized interpreter could execute these representations, and, as appropriate, the algorithms could be presented to learners in a readable form using a specialized text-generation module. A benefit of this approach is that certain automatic-debugging and optimization features could then be incorporated into the development tool, and the separate compilation step could be eliminated. Probable disadvantages of this approach are (1) the execution speed of the simulation may be slower due to the interpretation requirement, and (2) addition of every newly-supported language feature and function would require another upgrade to the parsing and the interpreter modules. Those skilled in the art would recognize that, at the extreme, this alternative approach could result in an engineering effort nearly as large as the development of a new compiler program with integrated debugging environment.

As previously mentioned, an alternative embodiment would have would have a separate tool for model development, which could process the code segments as just described, and a tool for assignment of properties relevant to the interactive learning environment. It can however be beneficial to have all development within one tool.

6. Instruments, Agents, and Externals

A complex system typically has both external and internal influences. When modeling a complex system, external (also known as "exogenous") influences by definition are not affected by any other entities in the model and by definition are not predictable. (Often it would be possible to create a model for an external influence and incorporate it into the model of the system, but this inevitably defines yet more external influences. As those skilled in the art appreciate, boundaries must be drawn whenever elaborating a model of a complex system.)

During development, the designer tests the model by systematically varying the values of the external influences (in our parlance, "instrument quantities") and observing the resulting behaviors of the model. However, when the model is used for educational purposes, it is not necessarily best to allow the learner to control the values of all external influences. As has been discussed, this is likely to cause cognitive overload for learners learning about the domain.

Equally importantly, learner experimentation with different combinations of values would frequently lead them to get mired in system states that are pedagogically "uninteresting." A state may be pedagogically uninteresting for any of a wide variety of reasons, such as: it's very hard to get out of the state, or it's a state that rarely or never occurs in the real world, or it's a more complicated situation than we want the learner to deal with, or the state simply does not relate to specific learning objectives that have been defined.

The present solution is to manage certain instrument quantities automatically and to make them inaccessible to learner control. In an embodiment of the invention, the same internal mechanisms are used for both (a) instrument quantities that the learner may control and (b) instrument quantities that the learner may not control, which we will refer to as "external quantities." Instrument quantities can thus have any of three different statuses:

1. Currently controlled by learner,
2. Control has been assigned to an automated agent by the learner, or
3. External quantity—control inaccessible to the learner.

An external quantity thus must have at least one automated agent defined to select a new value each period based on pedagogical considerations. Although from a technical standpoint an external quantity is simply a type of instrument quantity, to learners the two are portrayed as completely different types, and there is no mention of an agent or functionary controlling the external quantity's values.

Figure 15:
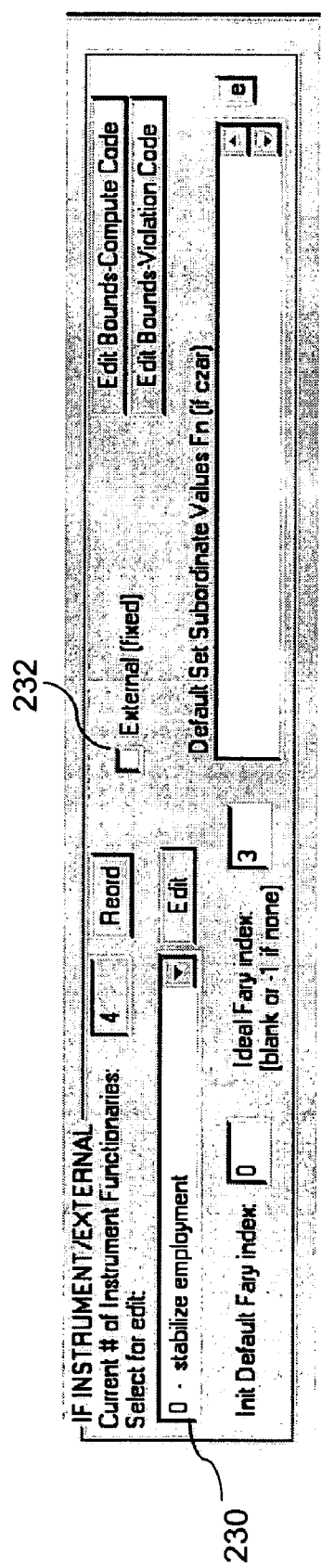
FIG. 15 illustrates a display showing the section of the development tool for editing the fields specific to an instrument quantity.
Figure 16:
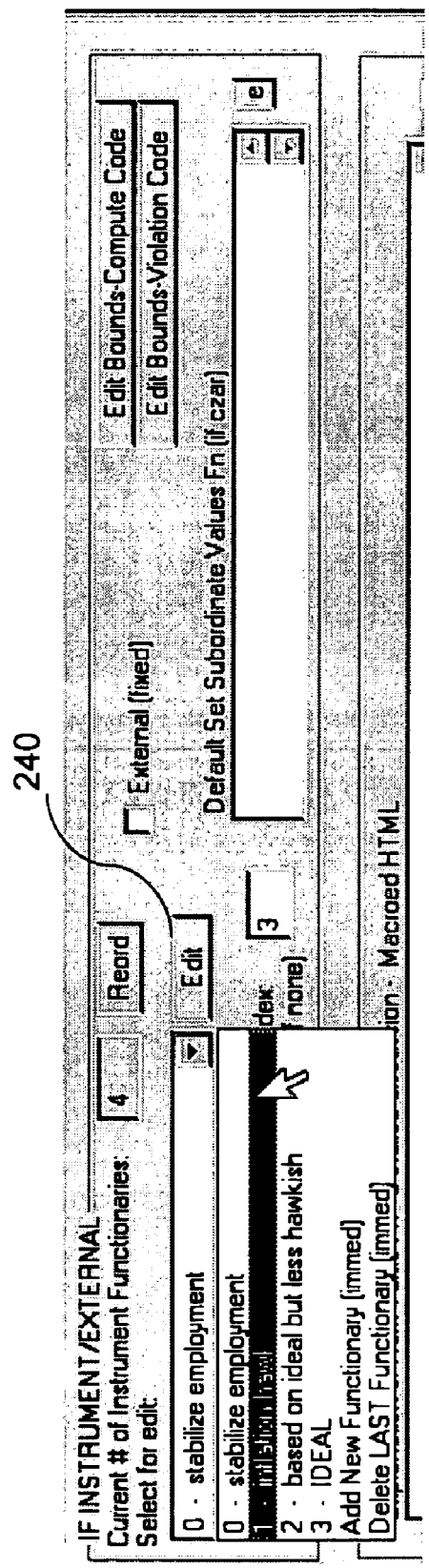
FIG. 16 illustrates a display showing an agent being selected for editing in the development tool.
Figure 17:
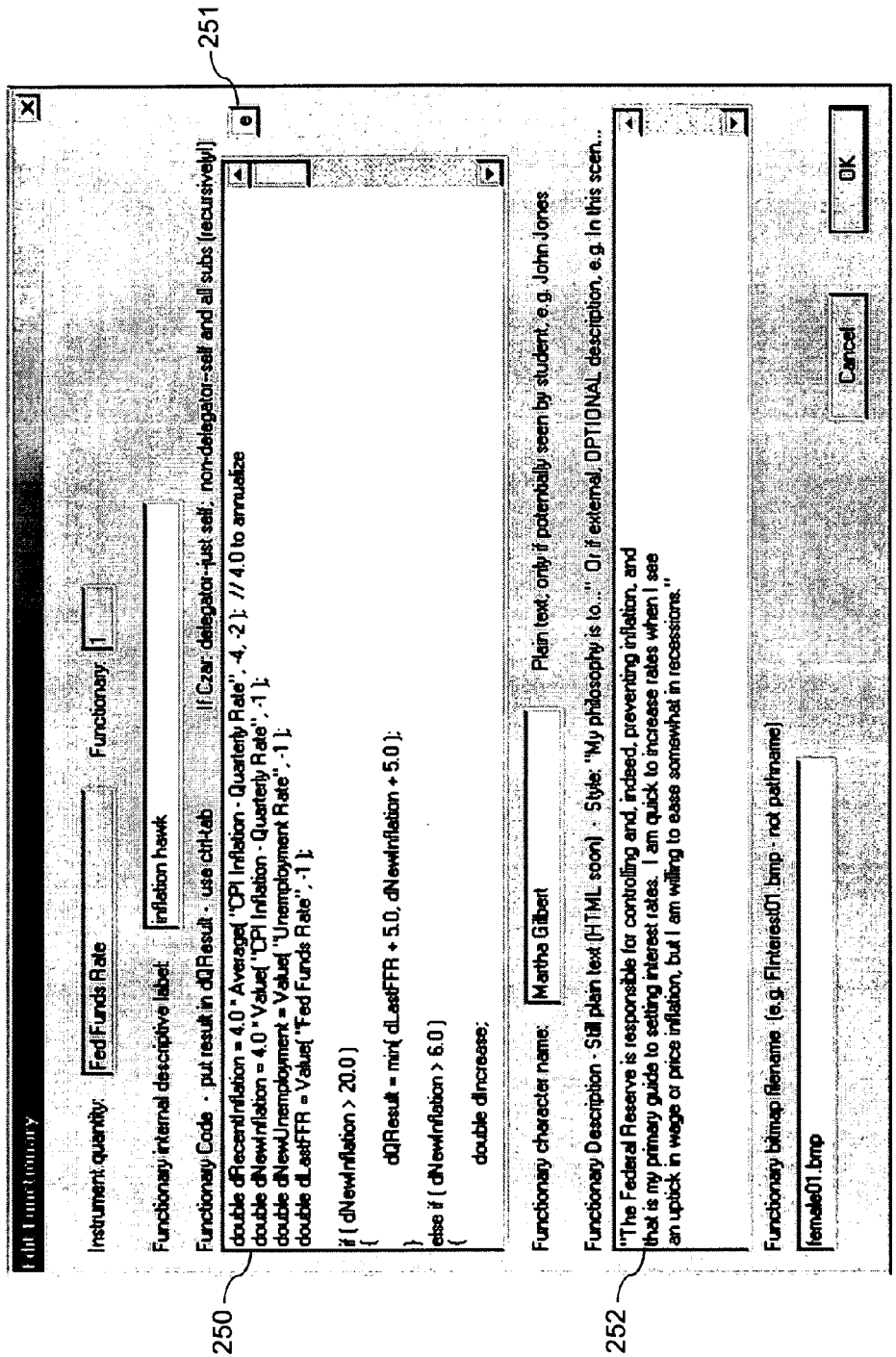
FIG. 17 illustrates a display showing a dialog for editing the fields for a selected agent in the development tool.

FIG. 15 shows the section of the development tool associated with editing the fields specific to an instrument quantity. By clicking on the drop-down list (230), the designer can add or edit agents, as shown in FIG. 16. After selecting an existing agent or adding a new one, the designer clicks on the Edit button (240), and a dialog like that shown in FIG. 17 appears.

The Functionary Code text box (250) contains the C code implementing the selected agent's algorithm. It corresponds to the FunctionaryFns field of the quantity data structure. By clicking the "e" button (251), the designer can edit the code in a larger edit window. The Functionary Description text box (252) corresponds to the FunctionaryStrategies field.

There are two different ways that an instrument quantity can be designated as an external quantity. To describe and contrast the two different methods requires that we now introduce the topic of scenarios.

7. Scenarios and Instruments

A single domain model may have several problem scenarios defined with it. Whenever a learner interacts with the present invention, it is in the context of a problem scenario. Whenever introduced to a scenario, the learner is told something about the system, its initial state, the set of instruments the learner has to work with, and what goals the learner should try to achieve.

Figure 18:
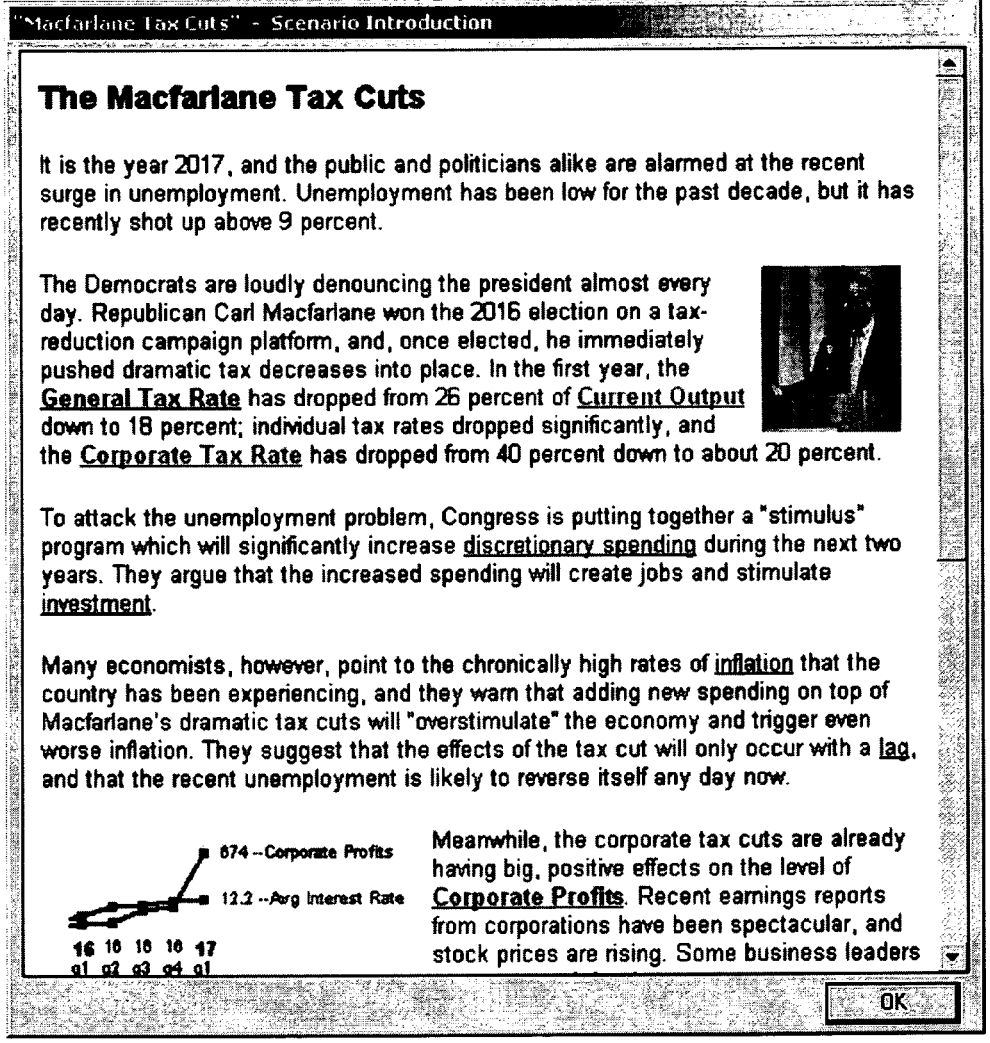
FIG. 18 illustrates a display showing an introduction to a particular scenario in the interactive learning environment.

The form of the introduction can simply be in text. FIG. 18 illustrates a dialog window that introduces a particular scenario in the domain of macroeconomics. In an alternative embodiment, the scenario could be introduced with a multimedia presentation, potentially including sound, video, and/or animation.

Working off of the same model, different scenarios can have different initial states (potentially including any number of "prior" periods), different external influences, different assumptions, and different agents available to manage instruments. Scenario development is performed in a "development mode" of the interactive learning environment, in which the designer can actually execute the simulation as a learner would, while setting various scenario properties with normally-hidden menus and dialogs.

A key set of properties specific to a scenario is the status and configuration of all of the instrument quantities in the model. Setting properties for the instruments affects the difficulty level of the scenario and the teaching focus. Each instrument in the model may have a scenario-specific Instrument Constraint that the designer edits.

Figure 19:
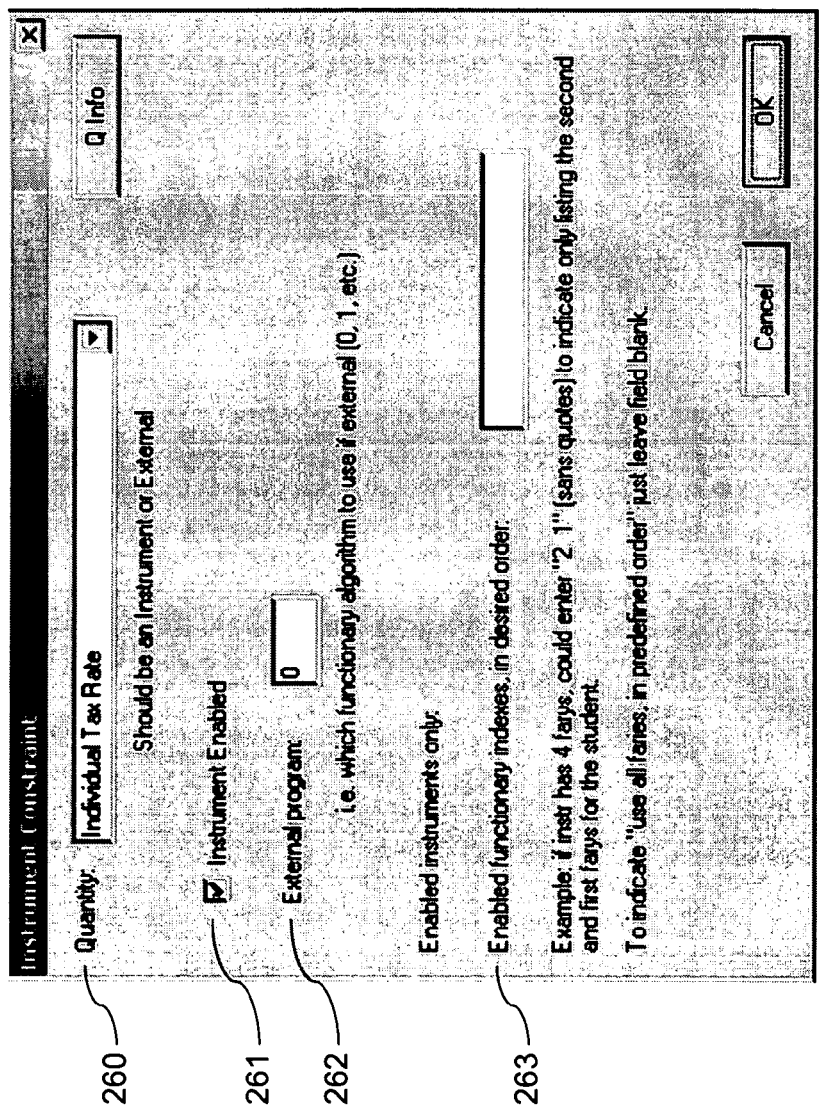
FIG. 19 illustrates a display showing a dialog for editing an Instrument Constraint in the development mode of the interactive learning environment.

FIG. 19 illustrates the dialog for editing an Instrument Constraint. The drop-down list (260) is used to select an instrument quantity. The Instrument Enabled checkbox (261) indicates whether the instrument will be "enabled" for the learner's control; in other words, if the box is not checked, then the instrument is configured as an external.

The External Program text box (262) is used when the instrument is external, to indicate which of the agents (a.k.a. functionaries) that have been defined for the quantity should be in control during the scenario. For example, suppose that two different agents have been defined for the Individual Tax Rate instrument quantity. The first agent will simply set the Individual Tax Rate at 18% in every period, while the second agent has been programmed to gradually raise the Individual Tax Rate up to 30% over a four-year time span (that is, 16 periods, in this macroeconomics model) and then hold at 30% forever after. If the designer unchecks the Instrument Enabled checkbox and enters "1" (the index is zero-based) in the External Program text box, then throughout that scenario the learner would not be able to control the Individual Tax Rate, which would gradually rise to 30% during the interaction. Depending upon teaching strategy, the learner could be informed in the scenario introduction that the Individual Tax Rate will be rising.

If, instead, the instrument is enabled for learner control, then the last text box (263) may be used to constrain which of the defined agents should be made available to the learner within this scenario. Again the decision of which automated agents to provide for the learner in a given scenario is driven by pedagogical considerations. For example, in one scenario, an agent programmed to implement very intelligent or optimal value-setting behavior could be included, while in a different scenario that agent could be excluded to ensure a greater challenge for learners.

So, again, for a given scenario, any or all instruments in the model may have their own Instrument Constraints defined. If no Instrument Constraint is defined for a particular instrument quantity, then that instrument is assumed to be enabled for learners, and all defined agents for that instrument are made accessible to the learners in that scenario.

There is one other way of configuring an instrument quantity as an external, besides using an Instrument Constraint. Referring back to FIG. 15, if the designer checks the External Fixed checkbox (232) in the development tool, then that instrument is permanently configured as an external for all scenarios. The designer can still use an Instrument Constraint with the quantity to select one of the defined agents for a particular scenario, but the quantity will never be accessible to learner control. This method can be used by a designer if it would never make sense to give the learner control of a particular instrument in any scenario, for example, for setting arcane constants, or for external influences that are always uncontrollable in the real world.

Giving the designer the ability to vary the set of enabled instruments from scenario to scenario is a powerful capability not typically available in training simulations and simulation games. It allows designers to create multiple new scenarios, each fine-tuned to match a different, specific set of learning objectives, while reusing the same domain model over and over without modification. With such a capability, production of educational quantitative model-based simulations becomes much more economically viable.

Scenarios can vary in both difficulty level and in area of emphasis. Difficulty can be varied both by changing the number of enabled instruments and by using different agents for the external quantities. The simplest scenario might only have one instrument that the learner is allowed to control, and external agents who intelligently and providently manage all the other external quantities. The most difficult scenarios would burden the learner with management of several instrument quantities, and would have external agents programmed to batter the system with volatile or malicious forces, and/or would set certain constants in a way that amplifies any mistakes made by the learner.

Similarly, the area of emphasis can be varied by the choice of instruments enabled and the behavior of the external agents. For example, the combination of external agents could conspire to create a narrow, specific type of problem in a particular subset of the system, or could cause a certain quantity to take on extreme values that the learner would have to contend with.

With this capability, designers can create a series of scenarios, starting with easier ones for novices, and progressively covering other, more advanced topics.

8. Explanations of Quantities for Learners

Especially when the number of quantities in a simulation is large, learners' introduction to a domain model can be overwhelming. Not only are they trying to learn new concepts and jargon, but the behaviors of outcome quantities can be unexpected or mysterious. To prevent learners from becoming discouraged, it is critical to provide learners with an easy way to get answers to their questions.

One approach is to require learners to read about the theory and jargon in textbook chapters before looking at the simulation. This can certainly help, especially when the subject matter is very specialized. However, while using the simulation, learners may not remember everything they previously read, and will frequently desire an in-context explanation. Moreover, an executable model typically must, if it is to adequately simulate the domain, contain intermediate quantities and parameters that would not normally appear in a general theoretical exposition.

From a cognitive perspective, it is best to provide an immediate answer to the learner at the point where they have the question. Learners should be able to obtain the answer about a quantity whenever and wherever the quantity is referenced or represented. In an embodiment of the invention, there are two principal contexts in which this is facilitated: graphical representations of the quantity, and textual references to the quantity.

Figure 20:
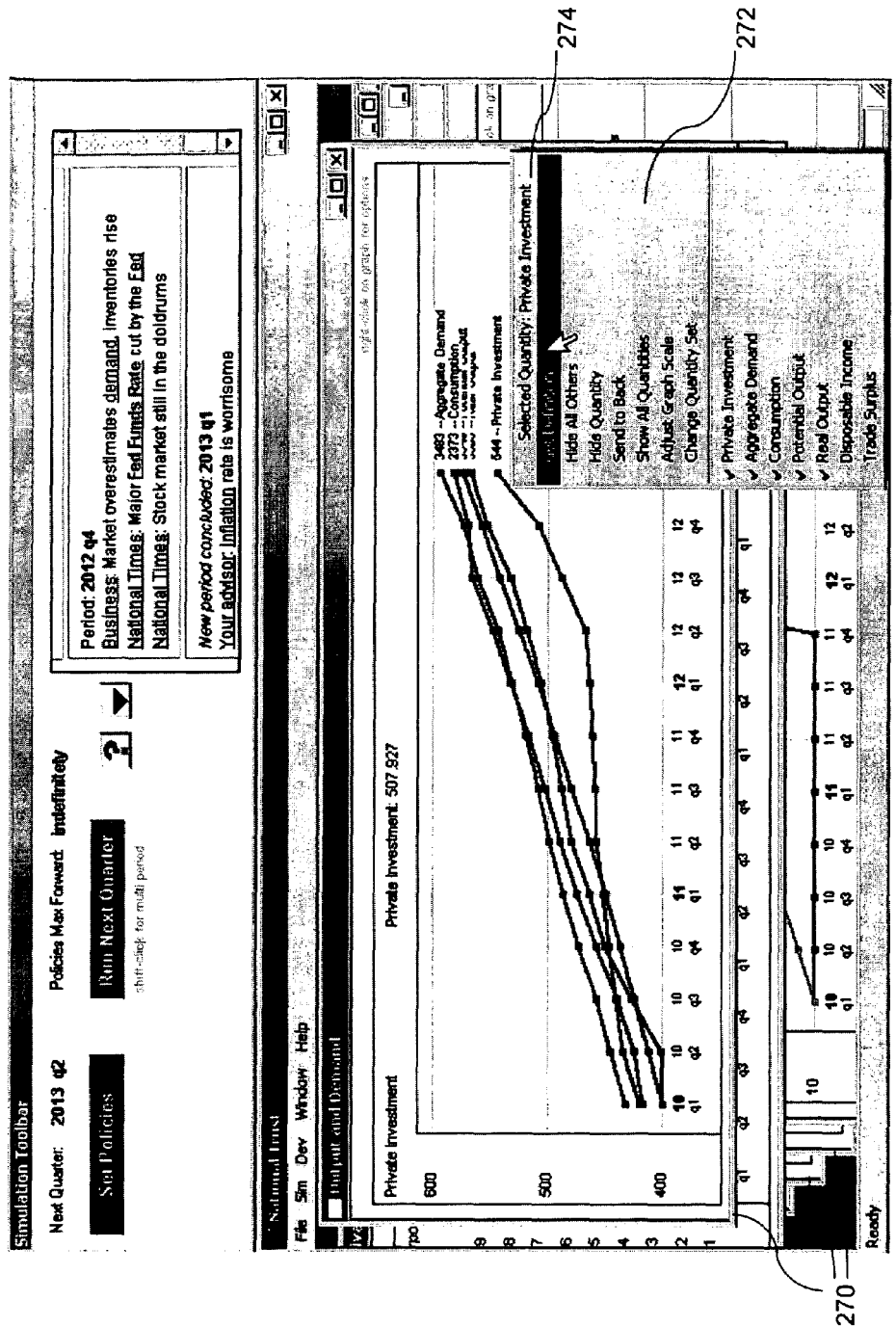
FIG. 20 illustrates a display showing a pop-up menu being selected for a particular quantity graph line in a Quantities Group window in the interactive learning environment.
Figure 21:
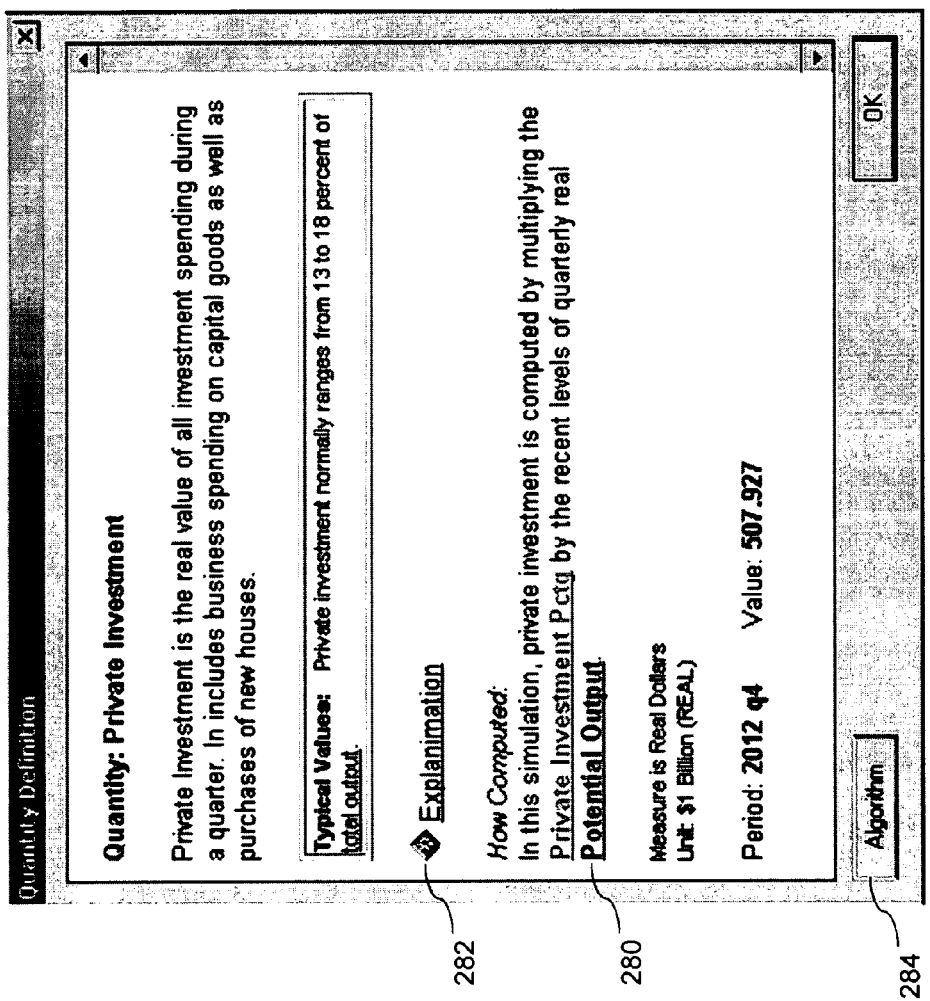
FIG. 21 illustrates a display showing a dialog providing a description of a selected quantity and links to additional information in the interactive learning environment.

Referring to FIG. 20, quantity values over time are depicted as graph lines in Quantities Groups (270). By right-clicking on a graph line for any quantity, a pop-up menu (272) appears, identifying the quantity that has been selected (274). By selecting the "Get Definition" option, a Quantity Definition dialog resembling FIG. 21 appears.

The Quantity Definition dialog at a minimum should convey what the quantity is or what it measures, and, if it is an outcome quantity, how the quantity value is computed. As will be discussed shortly, the description may contain a variety of other informative static or interactive material, but, in general, the crucial aim should be to anticipate and offer answers to any questions that learners are likely to have about the quantity.

The other type of context in which Quantity Definition dialogs may be obtained is anywhere that the name of the quantity appears throughout the learning environment. Wherever possible, textual material in the learning environment is rendered using hypertext, formatted with a language such as HTML, so that whenever a learner clicks on a quantity name, its Quantity Definition dialog is obtained. In the text of the Quantity Definition dialog itself, for example, each mention of another quantity is itself a hypertext link (280); and if the learner clicks on the other quantity name, then the Quantity Definition for that clicked quantity is presented. Quantity Definitions can also be obtained while editing instrument policies, in scenario introductions, and anywhere else that lists of quantities are presented.

Figure 22:
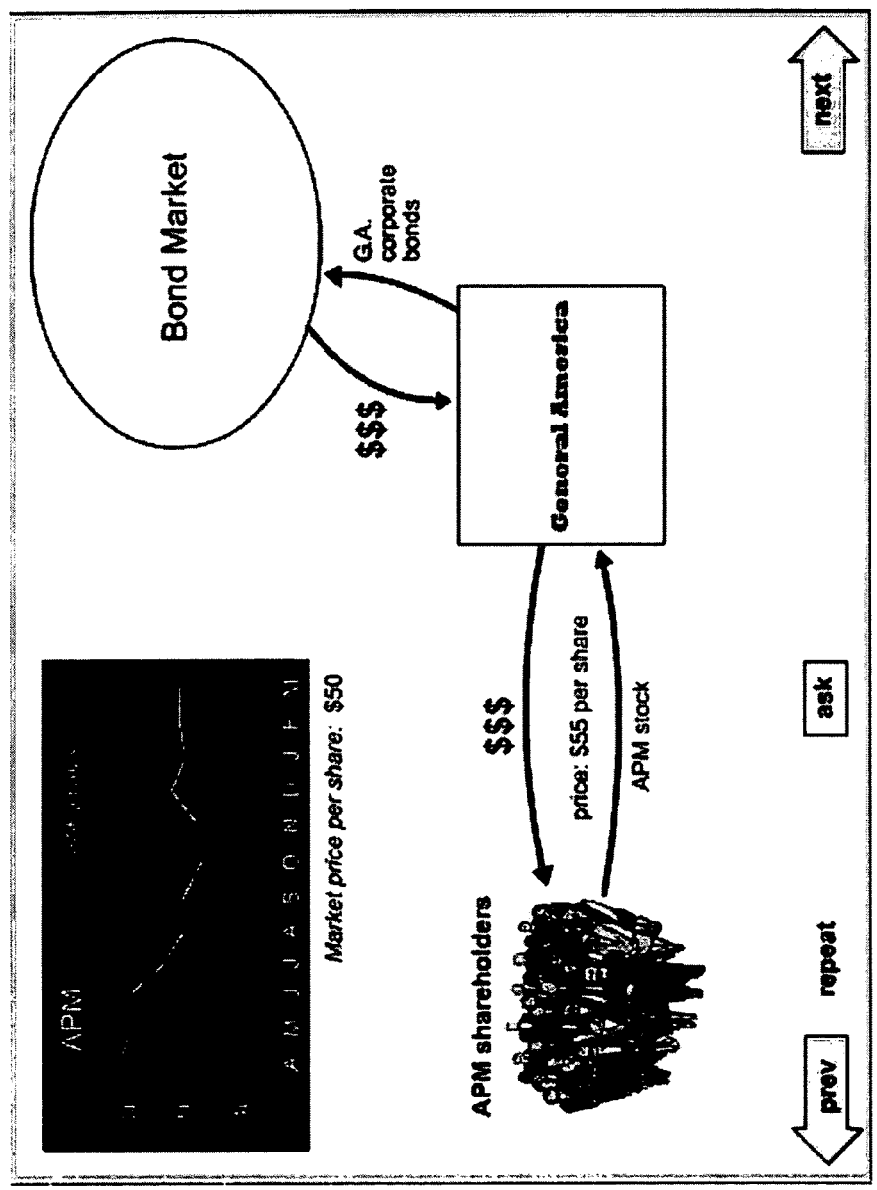
FIG. 22 illustrates a display showing a multimedia animation explaining concepts relating to a particular quantity in the interactive learning environment.

Information that is usefully included in a Quantity Definition includes:

a. A short description of the quantity and its meaning or significance. Clarification of the quantity's unit scale or type is also important.

b. A typical range of values that the quantity normally takes on. From a cognitive standpoint, this can be valuable for managing learners' cognitive load as they scan through lists of quantity values in the simulation and try to decide which ones are atypical and merit deeper scrutiny.

c. A multimedia exposition concerning the quantity. For example, clicking on the "Explanimation" link (282) in FIG. 21 results in the presentation of an interactive, narrated animation like that depicted in FIG. 22. Such an animation can explain theory, walk through a hypothetical example, show animated diagrams, or employ other teaching techniques.

d. A short description of how the quantity's value is computed each period in the simulation, including identification of the types of influences that other specified quantities have on the outcome.

e. A longer, more detailed description of the computation algorithm.

f. The actual source code itself. If the target learners are not technically sophisticated enough to understand computer programs, then this information might not be useful to include. However, when a learner is trying to achieve a scenario objective or make sense of puzzling behavior of a quantity, often the algorithmic detail is exactly what the learner needs; and pointless frustration will be the result if this information is unavailable. Referring again to FIG. 21, by clicking the Algorithm button (284), a dialog resembling FIG. 23 is displayed, including the actual source code for the quantity (290). In an alternative embodiment, the source code could be supplemented or replaced with flowcharts or other diagrams.

Thus, all details of the simulation model are accessible to learners for all quantities. This approach has been referred to as the "glass box model" because everything is visible to the learner. This is in contrast with so-called "black box" models which hide implementation details from users. For example, computer simulation games generally are "black box" models.

To summarize, learners are able to obtain answers to questions they have about quantities, immediately, and in context, and at the times of their own choosing. This type of exploration through educational material has been referred to as "non-linear," in contrast with the linear presentation in books or lectures. Providing the relevant information at the moment that the learner formulates his/her own questions is optimal from a learning standpoint. And knowing that this type of information is always available for every quantity can reduce the learner's stress level while they are trying to dissect the model of the complex system.

In an embodiment of the invention, all Quantity Definition information for all quantities is also included in a centralized index that is accessible to the learner, for whenever the learner has an out-of-context question.

9. Qualitative Summaries of Events and States

As the simulation executes and new sets of numeric values appear each period, learners often have difficulty relating quantitative outcomes to relevant theoretical concepts. They may not understand the significance of changes or combinations of changes in the system. Moreover, if the number of quantities in the model is large, they may forget or be unaware of noteworthy developments away from their current focus of attention.

In an embodiment of the invention, a mechanism is provided that detects certain conditions in the simulation and reports them to learners in qualitative terms. The issue of which conditions have significance and in what manner they will be communicated to learners is driven by pedagogical considerations.

Each time the model is executed, tests are run to determine what messages (if any) to present to the learner. In our macroeconomics example, descriptive messages are presented in the guise of news headlines that provide brief, one-line descriptions of selected economic conditions and their significance. Referring again to FIG. 4, zero or more news headlines are appended in the scrolling text box (122) after each new period is executed. In other domains, the "news headline" portrayal might be inappropriate or unnecessary and other characterizations could be used.

Figure 24:
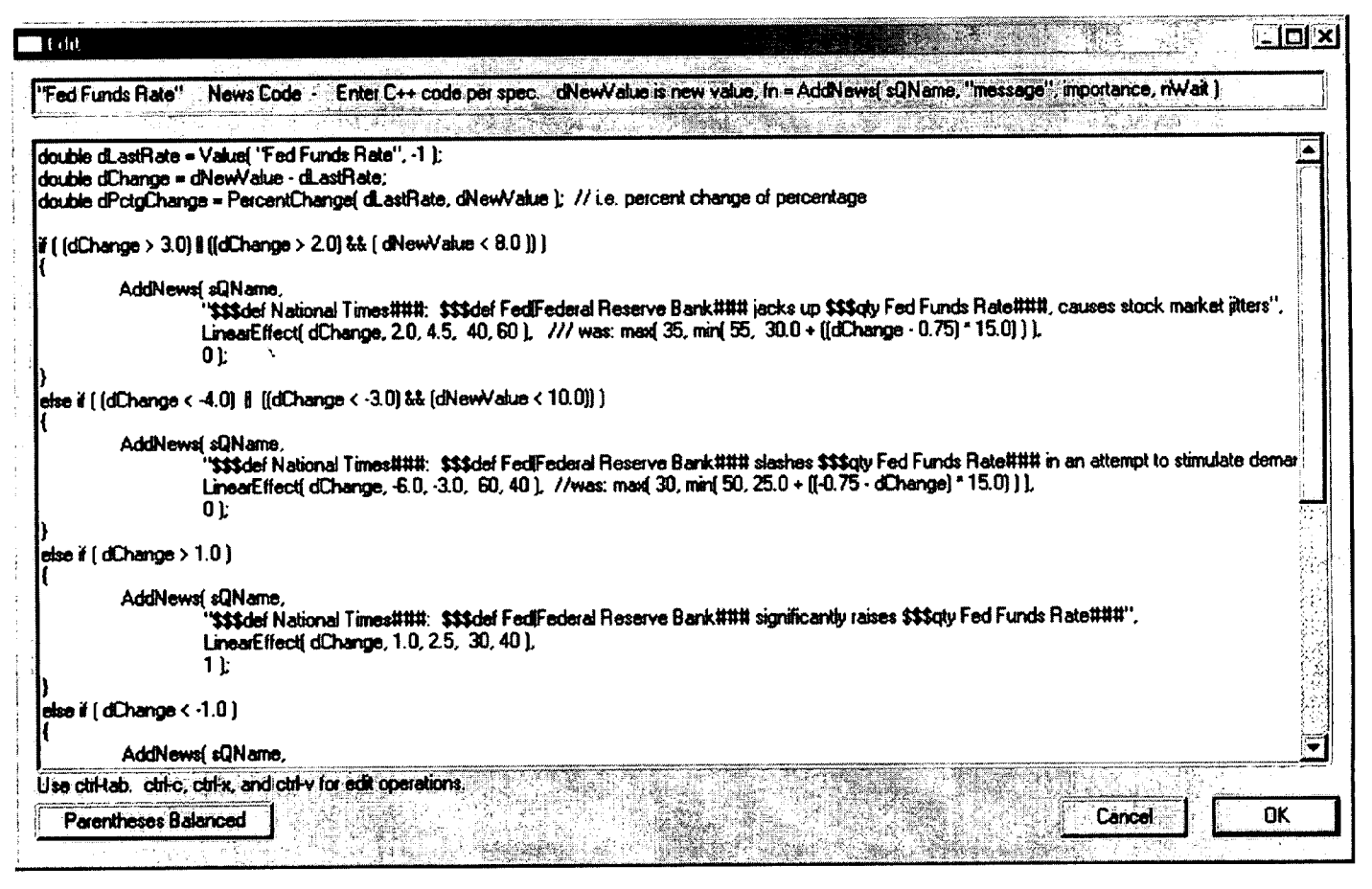

The designer sets up this behavior by programming condition tests in the development tool. Referring again to FIG. 11, the Edit News button (224) brings up a dialog resembling that depicted in FIG. 24. The C code entered by the designer is stored in the sNewsFn field of the quantity data structure. The code must examine new and prior values of various quantities to determine whether they are in a noteworthy state, and whenever this is the case, it adds appropriate text news item(s) to the list of messages for the new period. The test code for each quantity may add either zero, one, or several messages for the new period. Some quantities in the domain model may or may not have any associated condition tests.

After the model executes, all tests for all quantities are automatically run and the resulting messages are aggregated. Sometimes, however, the number of resulting messages may be large. If there are too many messages, or if particular messages frequently repeat, the messages will be less helpful to the learner. The ideal would be to show only a small number of messages each period, and to select messages which are the most useful or noteworthy for presentation. According to an embodiment of the invention, there are three complementary features for accomplishing this:

1) priority levels
2) repeatability limits
3) messages limit

Whenever a noteworthy condition is recognized, the function provided for adding a candidate message is AddNews, which has the following form:

AddNews(<quantity name>, <message text>,
<priority level>, <repeatability>)

Here, the priority level is a number between 0 and 100. Repeatability is a non-negative integer that defaults to zero and indicates the minimum number of periods that must elapse before the same particular message can again be presented to the learner. Note that the priority level and the repeatability numbers can either be hard-coded, or can be adjusted dynamically if the importance level of a message varies depending upon certain characteristics of the simulation model's state.

So, after the period executes and a list of candidate messages is aggregated, the messages are first sorted by priority level, with larger priority numbers being at the top of the list.

Next, the repeatability for each message is checked, and messages that violate the repeatability criterion are removed from the list. For example, if a particular message's repeatability value is 1, but the same condition held in the previous period and the same message had been presented to the learner, then this message would be removed from the current list. In essence, the value of 1 indicates that at least a one-period break must be observed before the learner should be bothered again with this particular message. The message would be removed in this case regardless of how high its priority level is.

Finally, a predefined messages limit, such as 5, constrains the total number of new messages that will be ever presented to the learner in a single period. So if the number of remaining candidate messages is greater than 5, only the five messages with the highest priority level are kept, and lower-priority messages are removed from the list.

Figure 25:
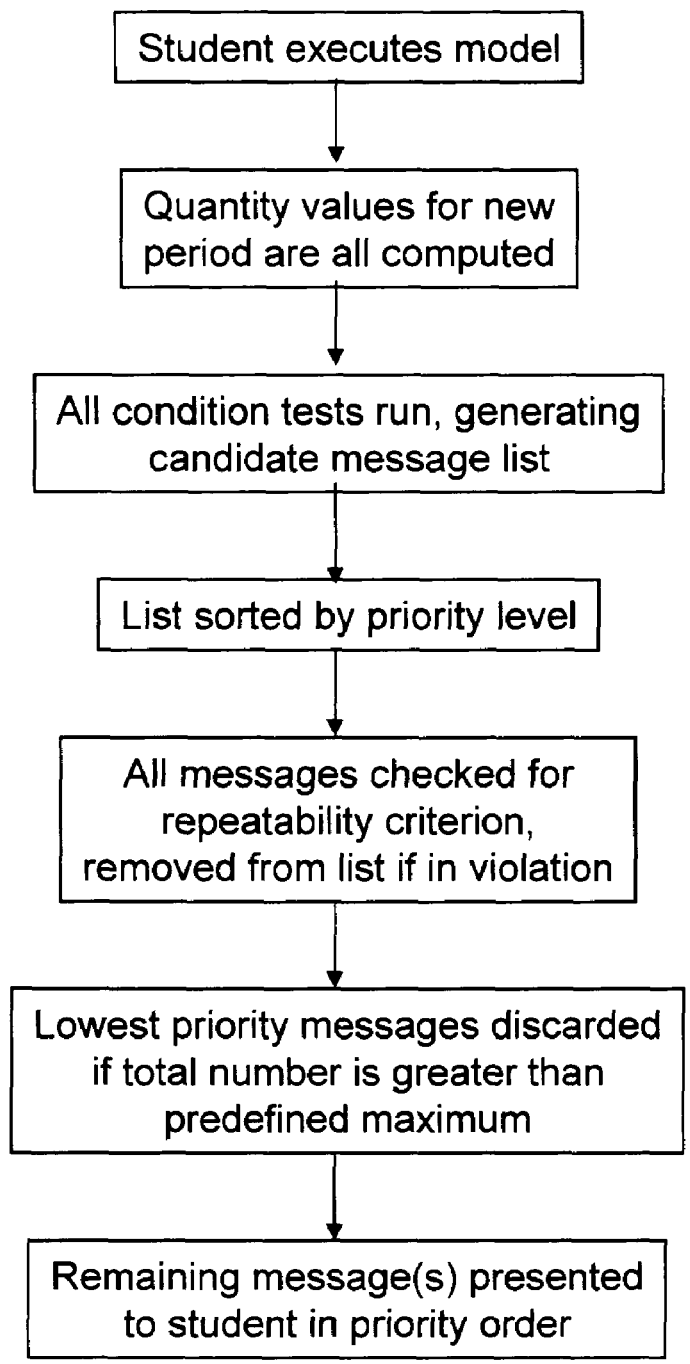
FIG. 25 is a flow chart showing a method for prioritizing and winnowing the qualitative messages to be presented to the learner after the execution of a period.

The remaining messages are then presented to the learner in priority order, with the highest priority message appearing at the top of the list. The process is depicted in the flowchart of FIG. 25.

The content of the messages should again be driven by pedagogical considerations. Messages may report to the learner when certain quantities are getting values that are "out of whack," or when dangerous or unusual combinations of quantity values occur, or when the trend for a particular quantity's value over time has significance for the state of the overall system. Messages may also have a more deliberate "coaching" function, as when a learner is warned of a trend that is likely to cause problems for achieving the learner's goals, or even an explicit recommendation to the learner, such as "quantity X's value is getting far too low—you should strongly consider pushing up the value of quantity Y." The message text can contain hyperlinks to fuller, more detailed explanations concerning the significance of the particular condition.

By this means, learners get a digestible list of messages with maximal significance and usefulness. This scheme is also helpful to the designer, who will want to issue warnings to the learner about basic issues in the simulation of the system, but does not want the reports to "sound like a broken record" when certain conditions are persistent. More generally, this scheme enables the designer to provide targeted messages in a quantitative simulation which may have an effectively infinite number of different possible states.

These qualitative summaries provide guidance and clues in a simulation that otherwise might appear to many learners as an intimidating wall of numbers. In combination with the ability to delegate instrument control to agents, and to obtain in-context explanations of how any outcome quantity is computed and descriptions of every quantity, learners can make steady progress in understanding the workings of very intricate models of complex systems. Together these features thwart discouragement, and can lead learners to deep insight and understanding, using a powerful instructional method.

I claim:

1. A computer system that executes a simulation model, comprising:

a. a plurality of model entities selected from the group consisting of instrument entities and outcome entities;

b. a code segment for displaying the values of selected model entities;

c. a code segment for presenting an in-context description of each outcome entity and the method used to compute said outcome entity's value, wherein a learner may use an interface control or clickable object for any outcome entity referenced or represented, at the locations at which it is referenced or represented, to thereby obtain said description;

d. a code segment for automatically presenting qualitative descriptions of one or more state changes in the simulation, based on specific occurrences in said simulation; and e. a means for a learner to control a selected instrument entity, wherein each instrument entity excluded from learner control is controlled by a selected automated agent, wherein each automated agent is a pre-programmed algorithm that accesses the state of the simulation and strategically controls said instrument entity.

2. The computer system according to claim 1, wherein the learner controls the selected instrument entity by selecting values or by delegating the selection to an automated agent.

3. The computer system according to claim 1 wherein said code segment for presenting an in-context description of each outcome entity and the method used to compute said outcome entity's value provides a link to a description for another related model entity.

4. The computer system according to claim 1 wherein said code segment for presenting an in-context description of each outcome entity and the method used to compute said outcome entity's value provides algorithmic details in said description of the method of computation.

5. The computer system according to claim 1 wherein said code segment for presenting qualitative descriptions of one or more state changes in the simulation automatically prioritizes said descriptions and automatically discards descriptions that are less helpful to the learner.

6. The computer system according to claim 1 wherein the simulation model is associated with a plurality of different problem scenarios, and a designer can allow the learner to control one set of instrument entities in one problem scenario and to control a different set of instrument entities in another problem scenario.

7. The computer system according to claim 6 wherein different sets of automated agents control the excluded instrument entities in different problem scenarios.

8. The computer system according to claim 1 wherein the simulation model is associated with a plurality of different problem scenarios, and the designer assigns one set of automated agents to an instrument entity in one problem scenario and a different set of automated agents to the instrument entity in another problem scenario.

9. The computer system according to claim 1, further comprising a development tool that a designer may use for defining model entities, properties, and simulation components.

10. The computer system according to claim 1 wherein the simulation model is a representation of an economic system.

11. The computer system according to claim 1 wherein the simulation model is a representation of an ecological system.

12. The computer system according to claim 1 wherein the simulation model is transmitted through a network.

13. The computer system according to claim 1 further comprising a graphical user interface for the learner to interact with the simulation.

14. A method for providing a learning experience comprising:
   a. executing a simulation model comprising a plurality of model entities selected from the group consisting of instrument entities and outcome entities;
   b. displaying the values of selected model entities;
   c. presenting an in-context description of each outcome entity and the method used to compute said outcome entity's value, wherein a learner may use an interface control or clickable object for any outcome entity referenced or represented, at the locations at which it is referenced or represented, to thereby obtain said description;
   d. automatically presenting qualitative descriptions of one or more state changes in the simulation, based on specific occurrences in said simulation; and
   e. providing a means for a learner to control a selected instrument entity, wherein each instrument entity excluded from learner control is controlled by a selected automated agent, wherein each automated agent is a pre-programmed algorithm that accesses the state of the simulation and strategically controls said instrument entity.

15. The method according to claim 14, wherein the learner controls the selected instrument entity by selecting values or by delegating the selection to an automated agent.

16. The method according to claim 14 further comprising providing algorithmic details in said description of the method of computation.

17. The method according to claim 14 wherein the simulation model provides a plurality of different problem scenarios and allows the learner to control one set of instrument entities in one problem scenario and to control a different set of instrument entities in another problem scenario.

18. The method according to claim 14, further providing a development tool that a designer may use for defining model entities, properties, and simulation components.

19. The method according to claim 14, further transmitting the simulation model through a network.

* * * * *